(12) United States Patent
Komada et al.

(10) Patent No.: US 10,618,596 B2
(45) Date of Patent: Apr. 14, 2020

(54) BICYCLE OPERATING DEVICE

(71) Applicant: SHIMANO INC., Sakai (JP)

(72) Inventors: Yasuyuki Komada, Sakai (JP); Yusuke Nishikawa, Shimonoseki (JP)

(73) Assignee: SHIMANO INC., Sakai (JP)

( * ) Notice: Subject to any disclaimer, the term of this patent is extended or adjusted under 35 U.S.C. 154(b) by 313 days.

(21) Appl. No.: 15/486,258

(22) Filed: Apr. 12, 2017

(65) Prior Publication Data

US 2018/0178878 A1 Jun. 28, 2018

Related U.S. Application Data

(63) Continuation-in-part of application No. 15/387,671, filed on Dec. 22, 2016, now abandoned.

(51) Int. Cl.
*B62L 3/02* (2006.01)
*B62K 23/06* (2006.01)
*F15B 21/044* (2019.01)

(52) U.S. Cl.
CPC .............. *B62L 3/023* (2013.01); *B62K 23/06* (2013.01); *F15B 21/044* (2013.01)

(58) Field of Classification Search
CPC ........ B62M 25/04; B62K 23/06; B62K 25/04; B62L 3/023; F15B 7/08; F15B 21/044
See application file for complete search history.

(56) References Cited

U.S. PATENT DOCUMENTS

| 9,821,881 | B2* | 11/2017 | Matsueda | ............... B62L 3/023 |
| 2013/0333994 | A1* | 12/2013 | Jordan | ..................... B62L 3/02 188/344 |
| 2014/0174236 | A1* | 6/2014 | Nakakura | .............. B62M 25/08 74/473.14 |
| 2016/0059926 | A1* | 3/2016 | Kariyama | ............... B62L 3/023 60/585 |

FOREIGN PATENT DOCUMENTS

CN 201385746 Y 1/2010

* cited by examiner

*Primary Examiner* — Abiy Teka
(74) *Attorney, Agent, or Firm* — Mori & Ward, LLP

(57) ABSTRACT

A bicycle operating device comprises a base member made of a resin material. The base member includes an outer surface, a cylinder bore, and at least one recess provided on the outer surface to define a cylinder wall between the cylinder bore and the at least one recess. The cylinder wall has a cylinder-wall thickness defined between the cylinder bore and the at least one recess. The cylinder-wall thickness is equal to or larger than 1 mm and equal to or smaller than 3.5 mm.

26 Claims, 33 Drawing Sheets

BICYCLE OPERATING DEVICE

CROSS-REFERENCE TO RELATED APPLICATIONS

The present application is a continuation-in-part application of the U.S. patent application Ser. No. 15/387,671 filed Dec. 22, 2016. The contents of this application are incorporated herein by reference in their entirety.

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an operating device.

SUMMARY OF THE INVENTION

In accordance with a first aspect of the present invention, a bicycle operating device comprises a base member made of a resin material. The base member includes an outer surface, a cylinder bore, and at least one recess provided on the outer surface to define a cylinder wall between the cylinder bore and the at least one recess. The cylinder wall has a cylinder-wall thickness defined between the cylinder bore and the at least one recess. The cylinder-wall thickness is equal to or larger than 1 mm and equal to or smaller than 3.5 mm.

With the bicycle operating device according to the first aspect, the at least one recess reduces deformation of an inner peripheral surface of the cylinder bore during manufacturing process of the base member made of the resin material.

In accordance with a second aspect of the present invention, a bicycle operating device comprises a base member made of a resin material. The base member includes an outer surface, a cylinder bore, and at least one recess. The outer surface includes a first surface, a second surface, a third surface, a fourth surface, a fifth surface, and a sixth surface. The cylinder bore has a cylinder center axis. The cylinder bore is provided between the first surface and the second surface and between the third surface and the fourth surface as viewed along the cylinder center axis. The at least one recess defines a cylinder wall between the cylinder bore and the at least one recess. The at least one recess is provided on at least two of the first surface, the second surface, the third surface, the fourth surface, the fifth surface, and the sixth surface.

With the bicycle operating device according to the second aspect, the at least one recess reduces deformation of an inner peripheral surface of the cylinder bore during manufacturing process of the base member made of the resin material.

In accordance with a third aspect of the present invention, the bicycle operating device according to the second aspect is configured so that the at least one recess includes at least one continuous recess continuously provided on at least two of the first surface, the second surface, the third surface, the fourth surface, the fifth surface, and the sixth surface.

With the bicycle operating device according to the third aspect, the at least one continuous recess effectively reduces deformation of the inner peripheral surface of the cylinder bore during manufacturing process of the base member made of the resin material.

In accordance with a fourth aspect of the present invention, the bicycle operating device according to the second or third aspect is configured so that the at least one recess includes at least one first recess and at least one second recess. The at least one first recess is provided on one of the at least two of the first surface, the second surface, the third surface, the fourth surface, the fifth surface, and the sixth surface. The at least one second recess is provided on another of the at least two of the first surface, the second surface, the third surface, the fourth surface, the fifth surface, and the sixth surface. The at least one second recess is separate from the at least one first recess.

With the bicycle operating device according to the fourth aspect, the at least one first recess and the at least one second recess effectively reduce deformation of the inner peripheral surface of the cylinder bore during manufacturing process of the base member made of the resin material with maintaining strength of the base member.

In accordance with a fifth aspect of the present invention, the bicycle operating device according to any one of the second to fourth aspects is configured so that the second surface is provided on a reverse side of the first surface. The third surface extends between the first surface and the second surface. The fourth surface is provided on a reverse side of the third surface.

With the bicycle operating device according to the fifth aspect, it is possible to effectively arrange the at least one recess about the cylinder bore if the at least one recess is provided on at least one of the first to fourth surfaces.

In accordance with a sixth aspect of the present invention, the bicycle operating device according to the fifth aspect is configured so that the fifth surface extends between the first surface and the second surface and between the third surface and the fourth surface. The sixth surface is provided on a reverse side of the fifth surface and extends between the first surface and the second surface and between the third surface and the fourth surface.

With the bicycle operating device according to the sixth aspect, it is possible to arrange the at least one recess about the cylinder bore if the at least one recess is provided on at least one of the fifth and sixth surfaces.

In accordance with a seventh aspect of the present invention, the bicycle operating device according to any one of the first to sixth aspects is configured so that the at least one recess includes recesses each provided on the outer surface to define the cylinder wall between the cylinder bore and the recesses.

With the bicycle operating device according to the seventh aspect, the recesses more effectively reduce deformation of the inner peripheral surface of the cylinder bore during manufacturing process of the base member made of the resin material.

In accordance with an eighth aspect of the present invention, a bicycle operating device comprises a base member made of a resin material. The base member including an outer surface, a cylinder bore having an inner diameter, and recesses each provided on the outer surface to define a cylinder wall between the cylinder bore and the recesses.

With the bicycle operating device according to the eighth aspect, the recesses reduce deformation of the inner peripheral surface of the cylinder bore during manufacturing process of the base member made of the resin material.

In accordance with a ninth aspect of the present invention, the bicycle operating device according to the seventh or eighth aspect is configured so that the cylinder wall has a cylinder-wall thickness defined between the cylinder bore and the recesses, a ratio of the cylinder-wall thickness to the inner diameter is equal to or larger than 5% and equal to or smaller than 40%.

With the bicycle operating device according to the ninth aspect, the recesses effectively reduce deformation of the inner peripheral surface of the cylinder bore during manufacturing process of the base member made of the resin material.

In accordance with a tenth aspect of the present invention, the bicycle operating device according to any one of the seventh to ninth aspects is configured so that the base member includes at least one rib provided between adjacent two of the recesses. The at least one rib has a thickness equal to or larger than 0.2 mm and equal to or smaller than 3 mm.

With the bicycle operating device according to the tenth aspect, the at least one rib maintains strength of the base member.

In accordance with an eleventh aspect of the present invention, the bicycle operating device according to any one of the seventh to ninth aspects is configured so that the base member includes at least one rib provided between adjacent two of the recesses. The at least one rib has a thickness equal to or smaller than the cylinder-wall thickness.

With the bicycle operating device according to the eleventh aspect, the recesses effectively reduce deformation of the inner peripheral surface of the cylinder bore during manufacturing process of the base member made of the resin material with maintaining strength of the base member.

In accordance with a twelfth aspect of the present invention, the bicycle operating device according to any one of the first to eleventh aspects is configured so that at least one of the at least one recess extends from the outer surface toward the cylinder bore.

With the bicycle operating device according to the twelfth aspect, the at least one recess effectively reduce deformation of the inner peripheral surface of the cylinder bore during manufacturing process of the base member made of the resin material.

In accordance with a thirteenth aspect of the present invention, the bicycle operating device according to any one of the first to twelfth aspects is configured so that at least one of the at least one recess extends along a cylinder center axis of the cylinder bore.

With the bicycle operating device according to the thirteenth aspect, the at least one recess effectively reduce deformation of the inner peripheral surface of the cylinder bore during manufacturing process of the base member made of the resin material.

In accordance with a fourteenth aspect of the present invention, the bicycle operating device according to any one of the first to thirteenth aspects further comprises an operating member pivotally coupled to the base member about a pivot axis. The base member includes a first end portion to be mounted to a bicycle handlebar, and a second end portion opposite to the first end portion. The cylinder bore is closer to the first end portion than the pivot axis.

With the bicycle operating device according to the fourteenth aspect, it is possible to operate a bicycle component using the operating member.

In accordance with a fifteenth aspect of the present invention, the bicycle operating device according to any one of the first to fourteenth aspects is configured so that the base member includes a first end portion to be mounted to a bicycle handlebar, a second end portion opposite to the first end portion, and a grip portion provided between the first end portion and the second end portion.

With the bicycle operating device according to the fifteenth aspect, the rider can grip the grip portion. This allows the bicycle operating device to be used for a road-type operating device.

In accordance with a sixteenth aspect of the present invention, the bicycle operating device according to the fifteenth aspect is configured so that the cylinder bore is provided in the grip portion.

With the bicycle operating device according to the sixteenth aspect, it is possible to utilize the grip portion as an area for the cylinder bore.

In accordance with a seventeenth aspect of the present invention, the bicycle operating device according to any one of the first to sixteenth aspects is configured so that the base member includes a reservoir bore connected to the cylinder bore, and at least one additional recess provided on the outer surface to define a reservoir wall between the reservoir bore and the at least one additional recess.

With the bicycle operating device according to the seventeenth aspect, the at least one additional recess reduces deformation of an inner peripheral surface of the reservoir bore during manufacturing process of the base member made of the resin material.

In accordance with an eighteenth aspect of the present invention, the bicycle operating device according to the seventeenth aspect is configured so that the reservoir wall has a reservoir-wall thickness defined between the reservoir bore and the at least one additional recess. The reservoir-wall thickness is equal to or larger than 0.5 mm and equal to or smaller than 6 mm.

With the bicycle operating device according to the eighteenth aspect, the at least one additional recess effectively reduces deformation of an inner peripheral surface of the reservoir bore during manufacturing process of the base member made of the resin material.

In accordance with a nineteenth aspect of the present invention, the bicycle operating device according to the seventeenth aspect is configured so that the reservoir wall has a reservoir-wall thickness defined between the reservoir bore and the at least one additional recess. The cylinder-wall thickness is equal to or smaller than the reservoir-wall thickness.

With the bicycle operating device according to the nineteenth aspect, it is possible to effectively reduce deformation of the inner peripheral surface of the cylinder bore during manufacturing process of the base member made of the resin material.

In accordance with a twentieth aspect of the present invention, the bicycle operating device according to any one of the first to nineteenth aspects is configured so that the base member has a maximum thickness defined between the cylinder bore and the outer surface. The maximum thickness is equal to or larger than 5 mm.

With the bicycle operating device according to the twentieth aspect, the maximum thickness of the base member maintains strength of the base member while the at least one recess is provided on the outer surface.

In accordance with a twenty-first aspect of the present invention, the bicycle operating device according to any one of the first to twentieth aspects is configured so that the at least one recess has a maximum depth defined from the outer surface to the cylinder wall. The cylinder-wall thickness is smaller than the maximum depth of the at least one recess.

With the bicycle operating device according to the twenty-first aspect, the cylinder-wall thickness effectively reduces deformation of the inner peripheral surface of the cylinder bore during manufacturing process of the base member made of the resin material.

In accordance with a twenty-second aspect of the present invention, the bicycle operating device according to the first aspect further comprises a first separate member. The at least one recess includes a first side recess provided on the outer surface to define the cylinder wall between the cylinder bore and the first side recess. The first separate member is a separate member from the base member and is provided in the first side recess.

With the bicycle operating device according to the twenty-second aspect, the first separate member makes the at least one recess larger with maintaining strength of the base member.

In accordance with a twenty-third aspect of the present invention, the bicycle operating device according to the twenty-second aspect is configured so that the first separate member is made of a first non-metallic material.

With the bicycle operating device according to the twenty-third aspect, the first non-metallic material saves weight of the first separate member.

In accordance with a twenty-fourth aspect of the present invention, the bicycle operating device according to the twenty-third aspect is configured so that the first non-metallic material includes at least one of a resin material and an elastic material.

With the bicycle operating device according to the twenty-fourth aspect, the first non-metallic material effectively saves weight of the first separate member.

In accordance with a twenty-fifth aspect of the present invention, the bicycle operating device according to any one of the twenty-second to twenty-fourth aspects is configured so that the first separate member is attached to the base member with at least one of a fastener and an adhesive agent.

With the bicycle operating device according to the twenty-fifth aspect, it is possible to firmly attach the first separate member to the base member.

In accordance with a twenty-sixth aspect of the present invention, the bicycle operating device according to any one of the twenty-second to twenty-fifth aspects is configured so that the first separate member includes a first separate wall spaced apart from a first bottom surface of the first side recess to define a first internal space between the first separate wall and the first bottom surface.

With the bicycle operating device according to the twenty-sixth aspect, it is possible to save weight of the first separate member.

In accordance with a twenty-seventh aspect of the present invention, the bicycle operating device according to any one of the twenty-second to twenty-sixth aspects further comprises a second separate member. The at least one recess includes a second side recess provided on the outer surface to define the cylinder wall between the cylinder bore and the second side recess. The second separate member is a separate member from the base member and is provided in the second side recess.

With the bicycle operating device according to the twenty-seventh aspect, the second separate member makes the at least one recess larger with maintaining strength of the base member.

In accordance with a twenty-eighth aspect of the present invention, the bicycle operating device according to the twenty-seventh aspect is configured so that the first separate member is provided on an opposite side of the second separate member relative to the cylinder bore.

With the bicycle operating device according to the twenty-eighth aspect, the first separate member and the second separate member make the at least one recess larger with maintaining strength of the base member.

In accordance with a twenty-ninth aspect of the present invention, the bicycle operating device according to the twenty-seventh or twenty-eighth aspect is configured so that the second separate member is made of a second non-metallic material.

With the bicycle operating device according to the twenty-ninth aspect, the second non-metallic material saves weight of the second separate member.

In accordance with a thirtieth aspect of the present invention, the bicycle operating device according to the twenty-ninth aspect is configured so that the second non-metallic material includes at least one of a resin material and an elastic material.

With the bicycle operating device according to the thirtieth aspect, the second non-metallic material effectively saves weight of the second separate member.

In accordance with a thirty-first aspect of the present invention, the bicycle operating device according to any one of the twenty-seventh to thirtieth aspects is configured so that the second separate member is attached to the base member with at least one of a fastener and an adhesive agent.

With the bicycle operating device according to the thirty-first aspect, it is possible to firmly attach the second separate member to the base member.

In accordance with a thirty-second aspect of the present invention, the bicycle operating device according to any one of the twenty-seventh to thirty-first aspects is configured so that the second separate member includes a second separate wall spaced apart from a second bottom surface of the second side recess to define a second internal space between the second separate wall and the second bottom surface.

With the bicycle operating device according to the thirty-second aspect, it is possible to save weight of the second separate member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
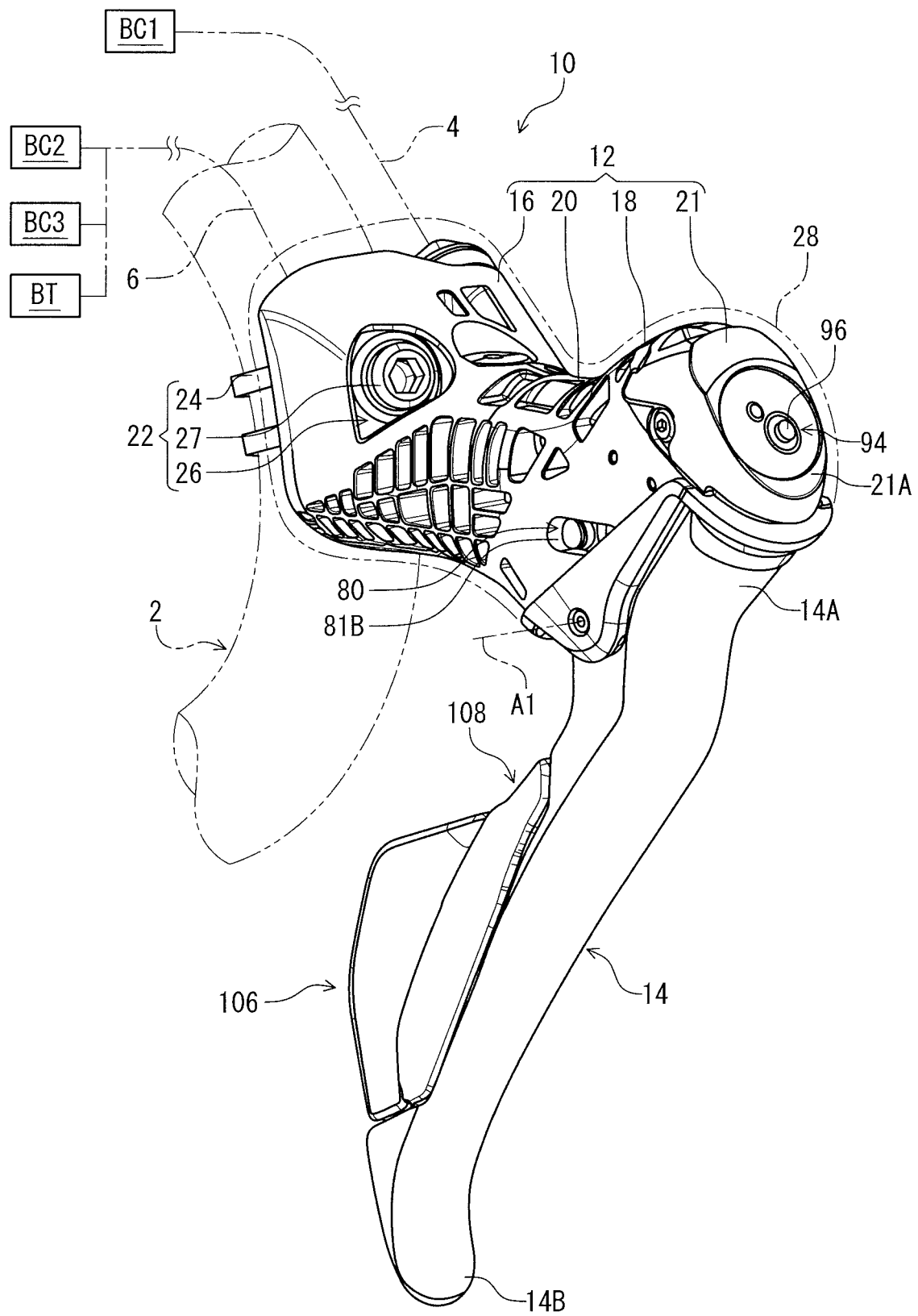
FIG. 1 is a perspective view of a bicycle operating device in accordance with an embodiment.

The embodiment(s) will now be described with reference to the accompanying drawings, wherein like reference numerals designate corresponding or identical elements throughout the various drawings.

Referring initially to FIG. 1, a bicycle operating device 10 in accordance with an embodiment of the present invention is configured to be mounted to a bicycle handlebar 2. In this embodiment, the bicycle operating device 10 is configured to be mounted to a drop-down handlebar. However, structures of the bicycle operating device 10 can be applied to other operating devices mounted to other type of handlebars such as a flat handlebar, a time trial handlebar, and a bull horn handlebar.

The bicycle operating device 10 is operatively coupled to at least one device to operate the at least one device. In this embodiment, the bicycle operating device 10 is operatively coupled to a hydraulic bicycle component BC1 such as a hydraulic brake device. The bicycle operating device 10 is operatively coupled to the hydraulic bicycle component BC1 via a hydraulic hose 4.

Figure 2:
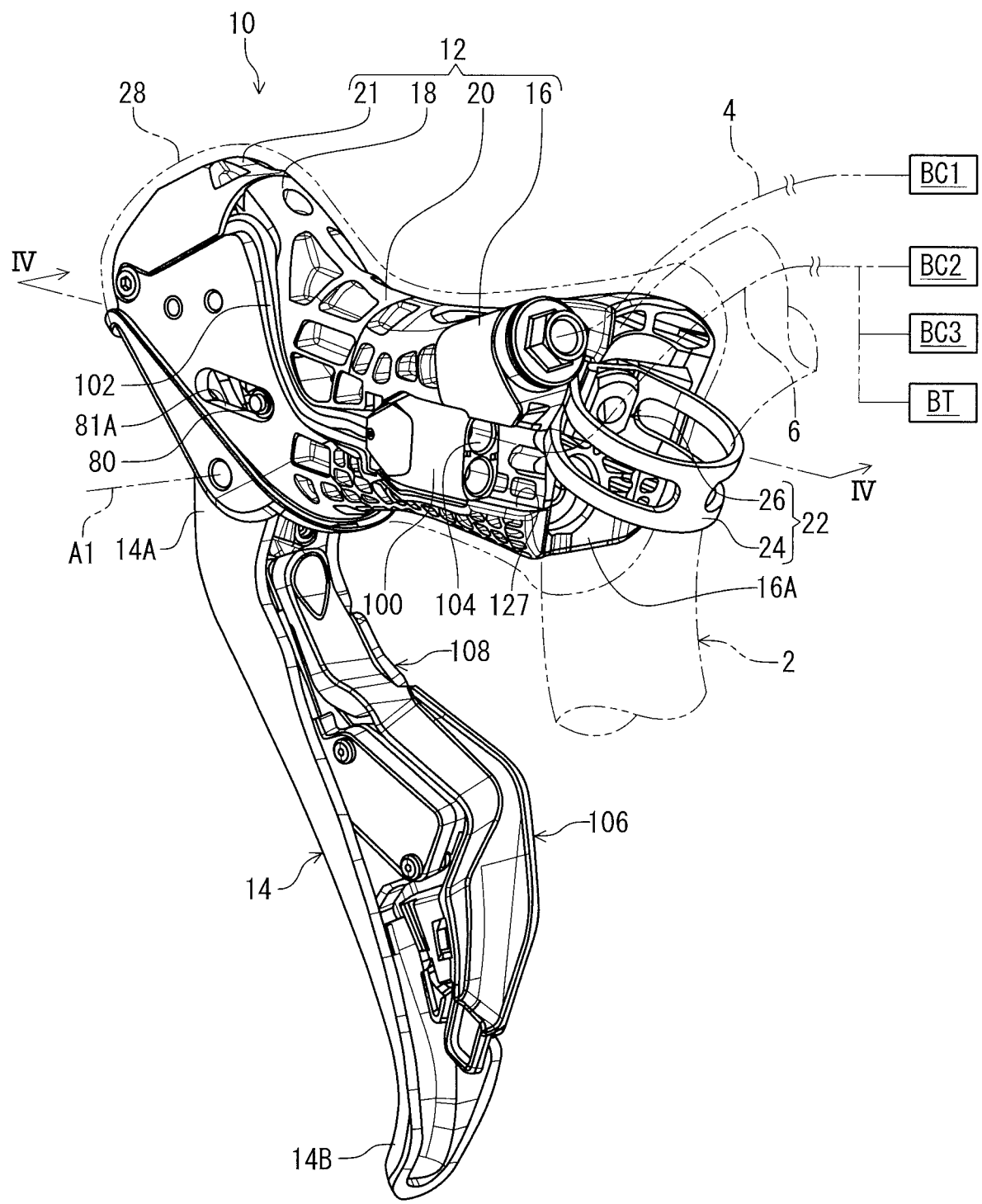
FIG. 2 is another perspective view of the bicycle operating device illustrated in FIG. 1.

As seen in FIG. 2, the bicycle operating device 10 is operatively coupled to an electrical device BC2 and an additional device BC3. Examples of the electrical device BC2 include an additional or satellite operating device, a bicycle seatpost, a bicycle suspension, a bicycle shifting device, a cycle computer, and a smart phone. Examples of the additional device BC3 include an electrical component and a mechanical component. Examples of the electrical component include an additional or satellite operating device, a bicycle seatpost, a bicycle suspension, a bicycle shifting device, a cycle computer, and a smart phone. Examples of the mechanical component include an additional or satellite operating device, a bicycle seatpost, a bicycle suspension, and a bicycle shifting device. In this embodiment, the electrical device BC2 includes the bicycle seatpost, and the additional device BC3 includes the bicycle shifting device. The bicycle operating device 10 is operatively coupled to the electrical device BC2 and the additional device BC3 via an electrical control cable 6. The bicycle operating device 10 is operatively coupled to the electrical device BC2 and the additional device BC3 via separate electrical control cables extending from the bicycle operating device 10, respectively. The bicycle operating device 10 can be operatively coupled to the additional device BC3 via a mechanical control cable in a case where the additional device BC3 includes a mechanical shifting device. Furthermore, the bicycle operating device 10 can be operatively coupled to at least one of the electrical device BC2 and the additional device BC3 via wireless communication. The additional device BC3 can be omitted if needed and/or desired.

In this embodiment, the bicycle operating device 10 is a right-hand side operating/control device configured to be operated by the rider's right hand to actuate the hydraulic bicycle component BC1. However, the structures of the bicycle operating device 10 can be applied to a left-hand side operating/control device.

In the present application, the following directional terms "front," "rear," "forward," "rearward," "left," "right," "transverse," "upward" and "downward" as well as any other similar directional terms refer to those directions which are determined on the basis of the user (e.g., the rider) who sits on a saddle (not shown) of a bicycle with facing the bicycle handlebar 2. Accordingly, these terms, as utilized to describe the bicycle operating device 10, should be interpreted relative to the bicycle equipped with the bicycle operating device 10 as used in an upright riding position on a horizontal surface.

As seen in FIGS. 1 and 2, the bicycle operating device 10 comprises a base member 12. The bicycle operating device 10 further comprises an operating member 14 pivotally coupled to the base member 12 about a pivot axis A1. The base member 12 includes a first end portion 16 to be mounted to the bicycle handlebar 2. The base member 12 includes a second end portion 18 that is opposite to the first end portion 16. In this embodiment, the base member 12 includes a grip portion 20 provided between the first end portion 16 and the second end portion 18. The bicycle operating device 10 comprises a pommel portion 21 provided at the second end portion 18. The pommel portion 21 is a separate member from the base member 12. The pommel portion 21 forwardly upwardly extends from the second end portion 18 in a mounting state where the base member 12 is mounted to the bicycle handlebar 2. At least one of the grip portion 20 and the pommel portion 21 can be omitted from the base member 12. The pommel portion 21 can be integrally provided with the base member 12 as a one-piece unitary member.

The first end portion 16 defines a first end surface 16A configured to be in contact with the bicycle handlebar 2. The pommel portion 21 defines a second end surface 21A (FIG. 3) farthest from the first end surface 16A. In this embodiment, the first end surface 16A has a curved surface, and the second end surface 21A has a flat surface. However, the shapes of the first end portion 16 and the second end portion 18 are not limited to this embodiment.

The bicycle operating device 10 further comprises a mounting structure 22 to mount the first end portion 16 to the bicycle handlebar 2. The base member 12 is a stationary member when mounted to the bicycle handlebar 2. The mounting structure 22 preferably includes a band clamp 24 and a tightening member 26. The tightening member 26 is coupled to the band clamp 24 and includes a mounting bolt 27 (FIG. 1) so as to clamp the bicycle handlebar 2 between the band clamp 24 and the first end portion 16. The mounting structure 22 can include other structures which is similar to the band clamp 24 and which is used in a road shifter for mounting to a drop-down handlebar.

The bicycle operating device 10 further comprises a grip cover 28 attached to the base member 12 to at least partly cover the base member 12. The grip cover 28 is made of a non-metallic material such as rubber. The pommel portion 21 is at least partly covered with the grip cover 28. A rider sometimes grips the base member 12 (e.g., the grip portion 20) and leans on the base member 12 (e.g., the grip portion 20) during riding. The grip cover 28 can be omitted from the bicycle operating device 10.

Figure 3:
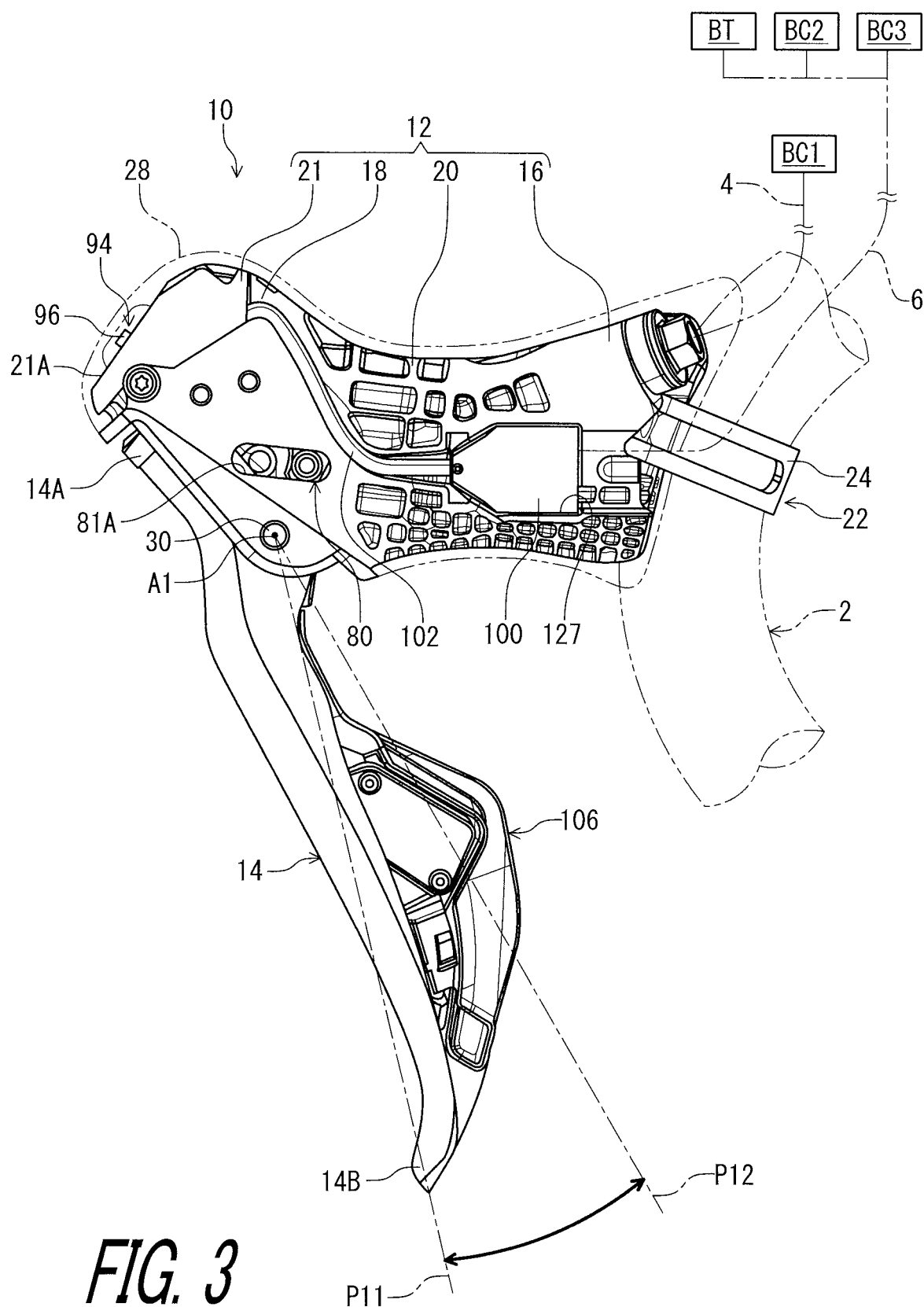
FIG. 3 is a side elevational view of the bicycle operating device illustrated in FIG. 1.

As seen in FIG. 3, the operating member 14 is provided as a lever extending in a longitudinal direction. The operating member 14 includes a proximal end portion 14A and a distal end portion 14B. The proximal end portion 14A is pivotally coupled to the base member 12 about the pivot axis A1. The distal end portion 14B is farther from the proximal end portion 14A than the pivot axis A1 in the longitudinal direction of the operating member 14. The distal end portion 14B is farthest from the proximal end portion 14A in the operating member 14 and constitutes a free end of the operating member 14.

The operating member 14 is pivotable relative to the base member 12 between a rest position P11 and an operated position P12 about the pivot axis A1. The bicycle operating device 10 includes a pivot shaft 30 defining the pivot axis A1. The pivot shaft 30 pivotally couples the operating member 14 to the base member 12. In this embodiment, the rest position P11 and the operated position P12 are defined by the pivot axis A1 and the distal end portion 14B.

In the present application, the term "rest position" as used herein refers to a position at which a movable part such as the operating member 14 remains stationary in a state where the movable part is not operated by the user. The term "operated position" as used herein refers to a position at which the movable part has been operated by the user to perform the operation of a bicycle component such as the hydraulic bicycle component BC1.

Figure 4:
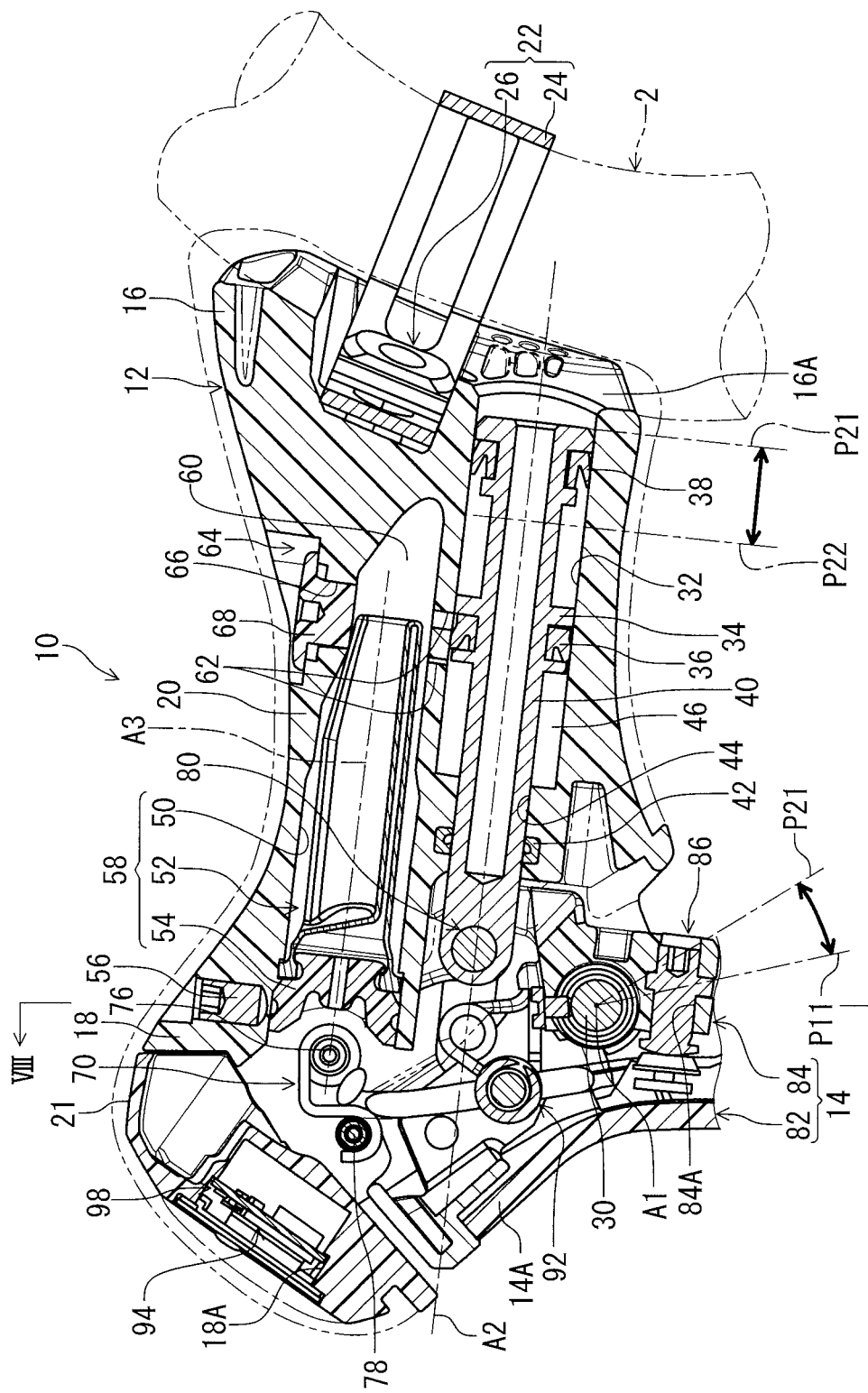
FIG. 4 is a cross-sectional view of the bicycle operating device taken along line IV-IV of FIG. 2.

As seen in FIG. 4, the base member 12 includes a cylinder bore 32. The cylinder bore 32 has a cylinder center axis A2. The cylinder bore 32 extends along the cylinder center axis A2. The cylinder bore 32 is connected to the first end surface 16A of the first end portion 16. The cylinder bore 32 is provided in the grip portion 20. The cylinder bore 32 is closer to the first end portion 16 than the pivot axis A1. The cylinder bore 32 is arranged between the pivot axis A1 and the first end portion 16. The pivot axis A1 is farther from the first end portion 16 than the cylinder bore 32.

The bicycle operating device 10 comprises a piston 34 movably provided in the cylinder bore 32. The piston 34 is movable relative to the cylinder bore 32 along the cylinder center axis A2. The piston 34 is operatively coupled to the operating member 14 to move in the cylinder bore 32 in response to a pivotal movement of the operating member 14. The operating member 14 is operatively coupled to the piston 34 to pull the piston 34 from an initial position P21 to an actuated position P22 in response to the pivotal movement of the operating member 14. Namely, the bicycle operating device 10 is configured to be a pull-type hydraulic operating device. However, the bicycle operating device 10 can be configured to be a push-type hydraulic operating device. The initial position P21 corresponds to the rest position P11 of the operating member 14. The actuated position P22 corresponds to the operated position P12 of the operating member 14.

The bicycle operating device 10 comprises a first seal ring 36 and a second seal ring 38. The first seal ring 36 and the second seal ring 38 are attached to the piston 34. The first seal ring 36 is spaced apart from the second seal ring 38 along the cylinder center axis A2.

The bicycle operating device 10 comprises a piston rod 40 and a third seal ring 42. The piston rod 40 is coupled to the piston 34 and extends from the piston 34 toward an opposite side of the first end portion 16 relative to the piston 34. While the piston rod 40 is integrally provided with the piston 34 as a one-piece unitary member in this embodiment, the piston rod 40 can be a separate member from the piston 34. The base member 12 includes a through-hole 44 coupled to the cylinder bore 32. The piston rod 40 is movably provided in the through-hole 44. The third seal ring 42 is provided in the through-hole 44. The cylinder bore 32, the piston 34, the first seal ring 36, and the third seal ring 42 define a hydraulic chamber 46. The hydraulic chamber 46 is filled with a hydraulic fluid such as mineral oil.

Figure 5:
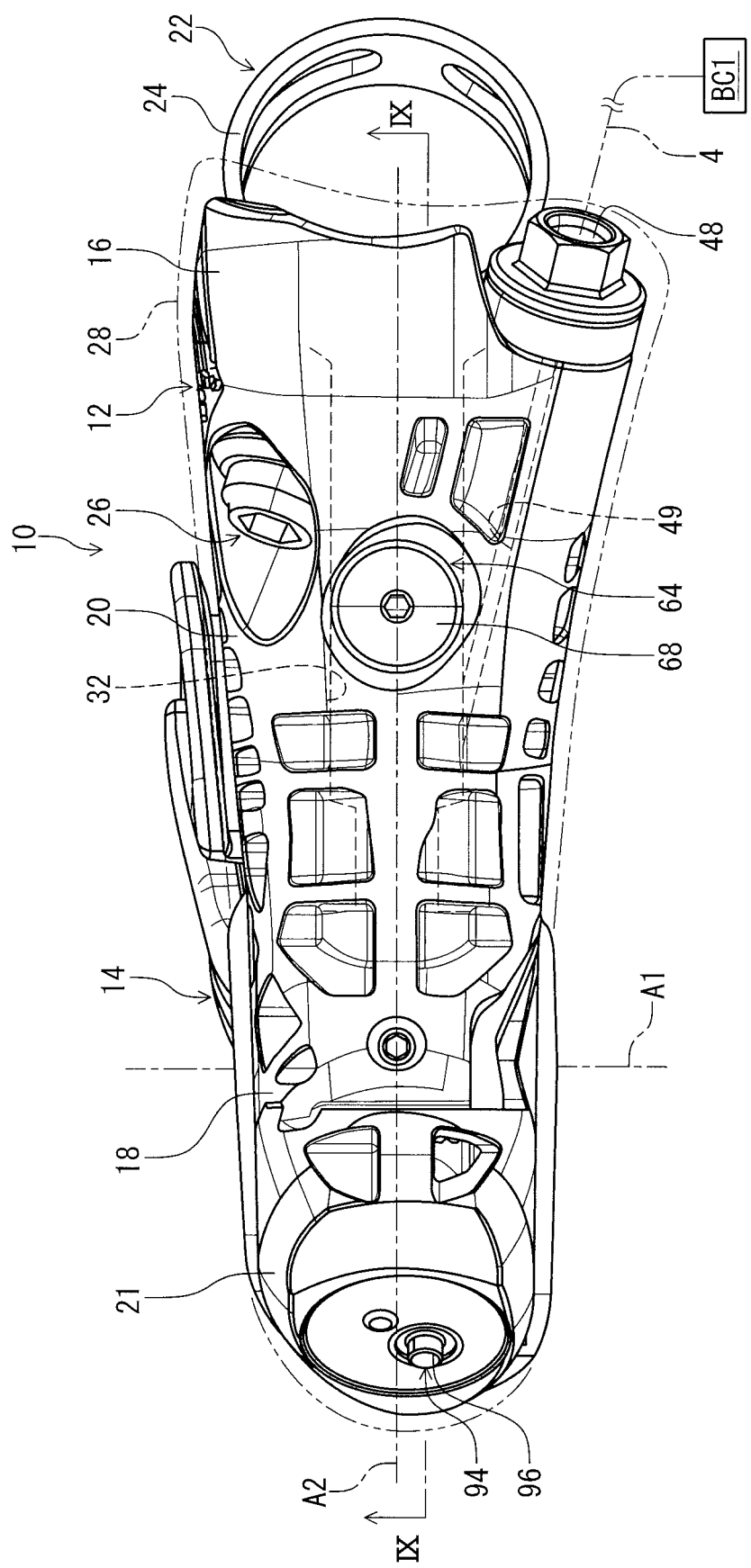
FIG. 5 is a plan view of the bicycle operating device illustrated in FIG. 1.

As seen in FIG. 5, the bicycle operating device 10 includes an outlet port 48 connected to the cylinder bore 32 to supply a hydraulic pressure to the hydraulic bicycle component BC1. The base member 12 includes an outlet passageway 49 connecting the outlet port 48 to the cylinder bore 32. The hydraulic chamber 46 is connected to the hydraulic hose 4 via the outlet passageway 49 and the outlet port 48.

As seen in FIG. 4, the base member 12 includes a reservoir bore 50 connected to the cylinder bore 32. The reservoir bore 50 is connected to the cylinder bore 32 to allow a hydraulic fluid to flow between the reservoir bore 50 and the cylinder bore 32. The reservoir bore 50 has a reservoir center axis A3. The reservoir bore 50 extends along the reservoir center axis A3. In this embodiment, the reservoir center axis A3 is parallel to the cylinder center axis A2.

However, the reservoir center axis A3 can be defined not to be parallel to the cylinder center axis A2.

The bicycle operating device 10 comprises a diaphragm 52 and a lid 54. The diaphragm 52 is provided in the reservoir bore 50 to be elastically deformable in the reservoir bore 50. The lid 54 is secured to the base member 12 to cover an end opening of the reservoir bore 50. In this embodiment, the lid 54 is secured to the base member 12 with a securing member 56. The reservoir bore 50, the diaphragm 52, and the lid 54 constitute a hydraulic reservoir 58. The reservoir bore 50 and the diaphragm 52 define a reservoir chamber 60. The reservoir chamber 60 is filled with the hydraulic fluid such as mineral oil.

In this embodiment, the reservoir bore 50 is provided above the cylinder bore 32 in the mounting state where the base member 12 is mounted to the bicycle handlebar 2. The reservoir bore 50 is farther from the distal end portion 14B (FIG. 3) than the cylinder bore 32. However, the position of the reservoir bore 50 is not limited to this embodiment. The reservoir bore 50 can be omitted from the bicycle operating device 10.

The base member 12 includes communication holes 62. The communication holes 62 connect the reservoir chamber 60 with the hydraulic chamber 46 in a state where the piston 34 is positioned at the initial position P21. The first seal ring 36 interrupts communication between the hydraulic chamber 46 and the reservoir chamber 60 via the communication holes 62 when the piston 34 is moved from the initial position P21 toward the actuated position P22. The hydraulic reservoir 58 can be omitted from the bicycle operating device 10 or can be provided at the hydraulic bicycle component BC1.

As seen in FIG. 4, the base member 12 includes a bleeding port 64 connected to the reservoir bore 50. In this embodiment, the bleeding port 64 includes a threaded hole 66. The threaded hole 66 connects the reservoir bore 50 to an outside surface of the base member 12. The bicycle operating device 10 includes a bleeding plug 68. The bleeding plug 68 is threadedly engaged with the threaded hole 66. The bleeding port 64 can be omitted from the bicycle operating device 10.

The bicycle operating device 10 further comprises a piston biasing member 70 to bias the piston 34 from the actuated position P22 toward the initial position P21. In this embodiment, the piston biasing member 70 is provided outside the cylinder bore 32. However, the piston biasing member 70 can be provided in the cylinder bore 32.

Figure 6:
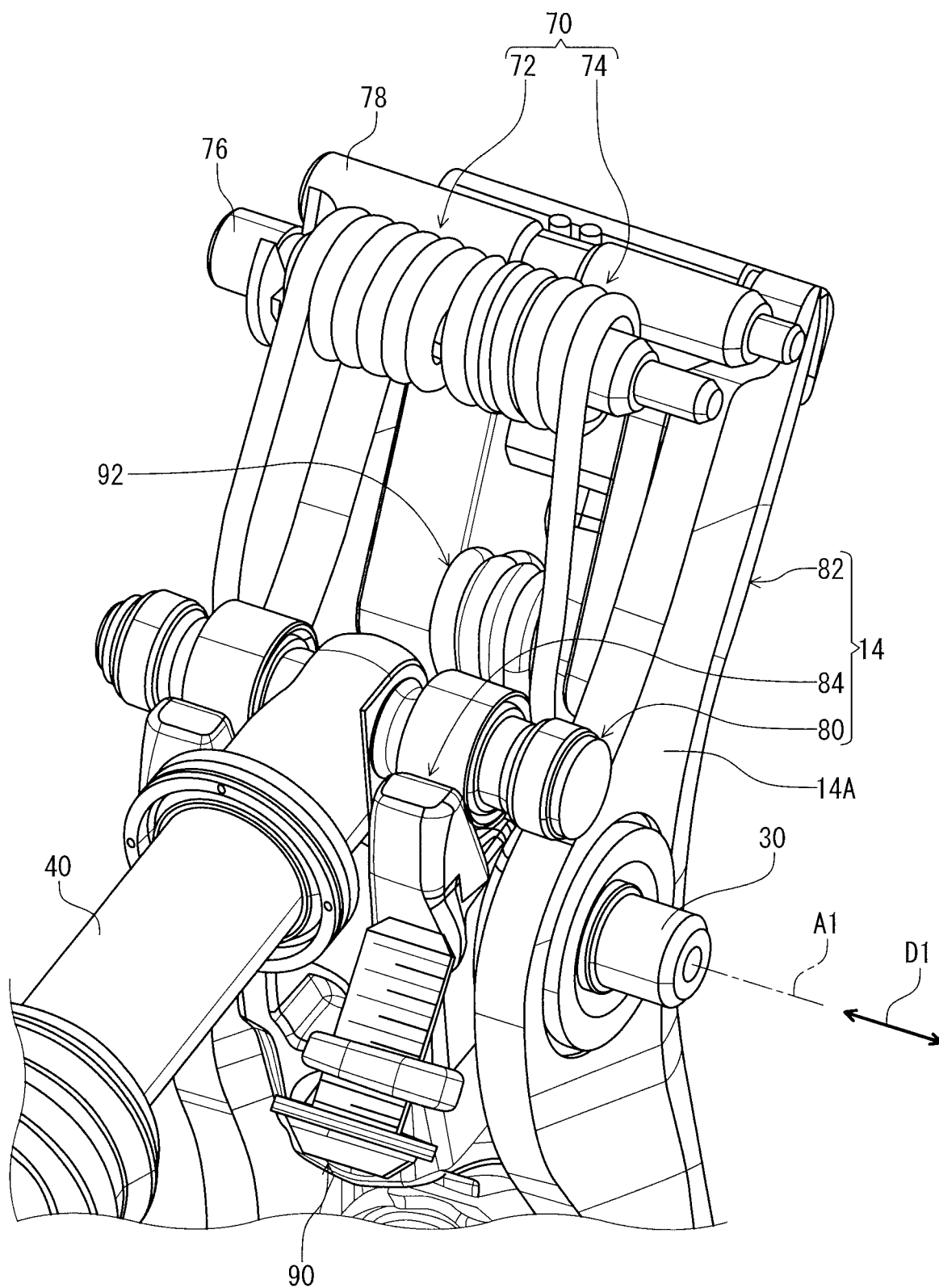
FIG. 6 is a perspective view of the bicycle operating device illustrated in FIG. 1 with a base member omitted.

As seen in FIG. 6, the piston biasing member 70 includes a first biasing element 72 and a second biasing element 74. While the first and second biasing elements 72 and 74 are torsion coil springs in this embodiment, the first and second biasing elements 72 and 74 can be other biasing elements such as a compression coil spring.

The bicycle operating device 10 includes a first support shaft 76 and a second support shaft 78. The first support shaft 76 is secured to the base member 12 (FIG. 4) and extends in an axial direction D1 of the pivot axis A1 of the operating member 14. The second support shaft 78 is secured to the base member 12 (FIG. 4) and extends in the axial direction D1. The first and second biasing elements 72 and 74 are mounted on the first support shaft 76. The bicycle operating device 10 includes a coupling shaft 80 coupled to an end of the piston rod 40. The coupling shaft 80 extends in the axial direction D1. As seen in FIGS. 1 and 3, the base member 12 includes a first guide groove 81A and a second guide groove 81B. The coupling shaft 80 is movably provided in the first guide groove 81A and the second guide groove 81B. Each of the first and second biasing elements 72 and 74 is engaged with the first support shaft 76 and the coupling shaft 80 to bias the piston 34 toward the initial position P21 (FIG. 4). Thus, the operating member 14 is biased toward the rest position P11 by the first and second biasing elements 72 and 74.

As seen in FIGS. 4 and 6, the operating member 14 includes an operating lever or main body 82 and an intermediate body 84. The proximal end portion 14A and the distal end portion 14B are provided on the operating lever 82. The intermediate body 84 is a separate member from the operating lever 82. The operating lever 82 and the intermediate body 84 are pivotally coupled to the base member 12 about the pivot axis A1 via the pivot shaft 30. The operating lever 82 and the intermediate body 84 are rotatable relative to each other about the pivot axis A1. In this embodiment, the operating lever 82 includes the proximal end portion 14A and the distal end portion 14B. Namely, the rest position P11 and the operated position P12 are defined by the operating lever 82. The intermediate body 84 is engaged with the coupling shaft 80 to transmit an operation force applied to the operating lever 82.

As seen in FIG. 4, the bicycle operating device 10 comprises a first adjusting member 86 to change the rest position P11 of the operating member 14 relative to the base member 12. In this embodiment, the first adjusting member 86 is mounted to the operating member 14. The first adjusting member 86 is attached to the intermediate body 84 of the operating member 14. The intermediate body 84 include a first threaded hole 84A. The first adjusting member 86 includes an adjustment screw and is threadedly engaged with the first threaded hole 84A. An end of the first adjusting member 86 is in contact with the operating lever 82. Rotation of the first adjusting member 86 relative to the intermediate body 84 changes a position of the operating lever 82 relative to the intermediate body 84. This changes the rest position P11 of the operating member 14 without changing the initial position P21 of the piston 34.

As seen in FIG. 6, the bicycle operating device 10 comprises a second adjusting member 90 to change the initial position P21 (FIG. 4) of the piston 34 relative to the base member 12. In this embodiment, the second adjusting member 90 includes an adjusting screw mounted to the base member 12 (FIG. 4). The second adjusting member 90 is threadedly engaged with a threaded hole (not shown) of the base member 12 (FIG. 4). An end of the second adjusting member 90 is in contact with the intermediate body 84. Rotation of the second adjusting member 90 changes a position of the intermediate body 84 relative to the base member 12. This changes the initial position P21 of the piston 34 and further changes the rest position P11 of the operating member 14.

Figure 7:
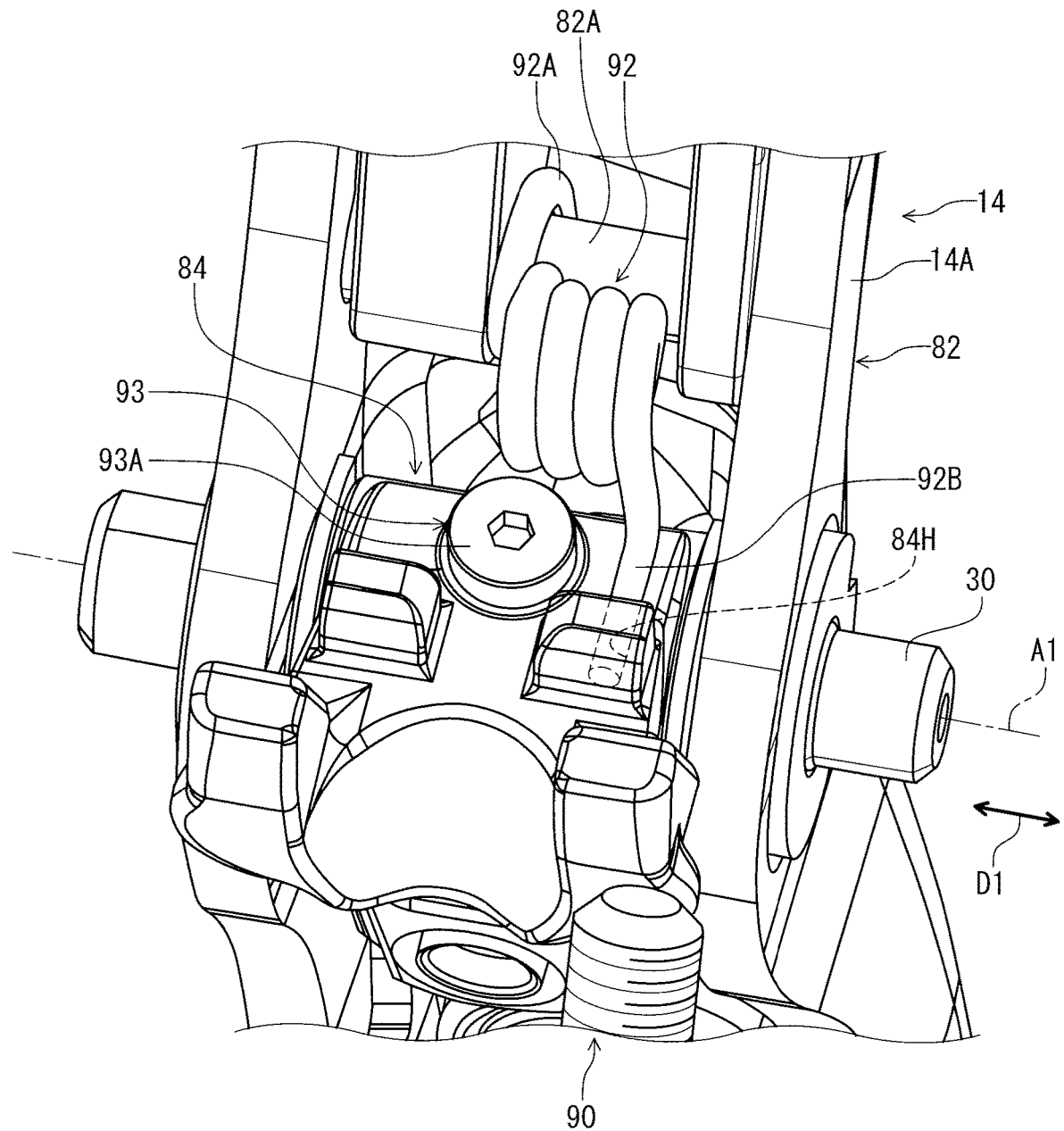
FIG. 7 is an enlarged perspective view of the bicycle operating device illustrated in FIG. 1 with the base member omitted.

As seen in FIG. 7, the bicycle operating device 10 comprises a lever biasing member 92 to bias the operating lever 82 relative to the intermediate body 84 to keep contact between the first adjusting member 86 (FIG. 4) and the operating lever 82. The lever biasing member 92 is attached to the operating member 14. The lever biasing member 92 includes a first end 92A and a second end 92B. The first end 92A of the lever biasing member 92 is coupled to a support shaft 82A of the operating lever 82. The second end 92B of the lever biasing member 92 is provided in a support hole 84H of the intermediate body 84. While the lever biasing member 92 is a torsion coil spring in this embodiment, the lever biasing member 92 can be other biasing elements such as a compression coil spring.

Figure 8:
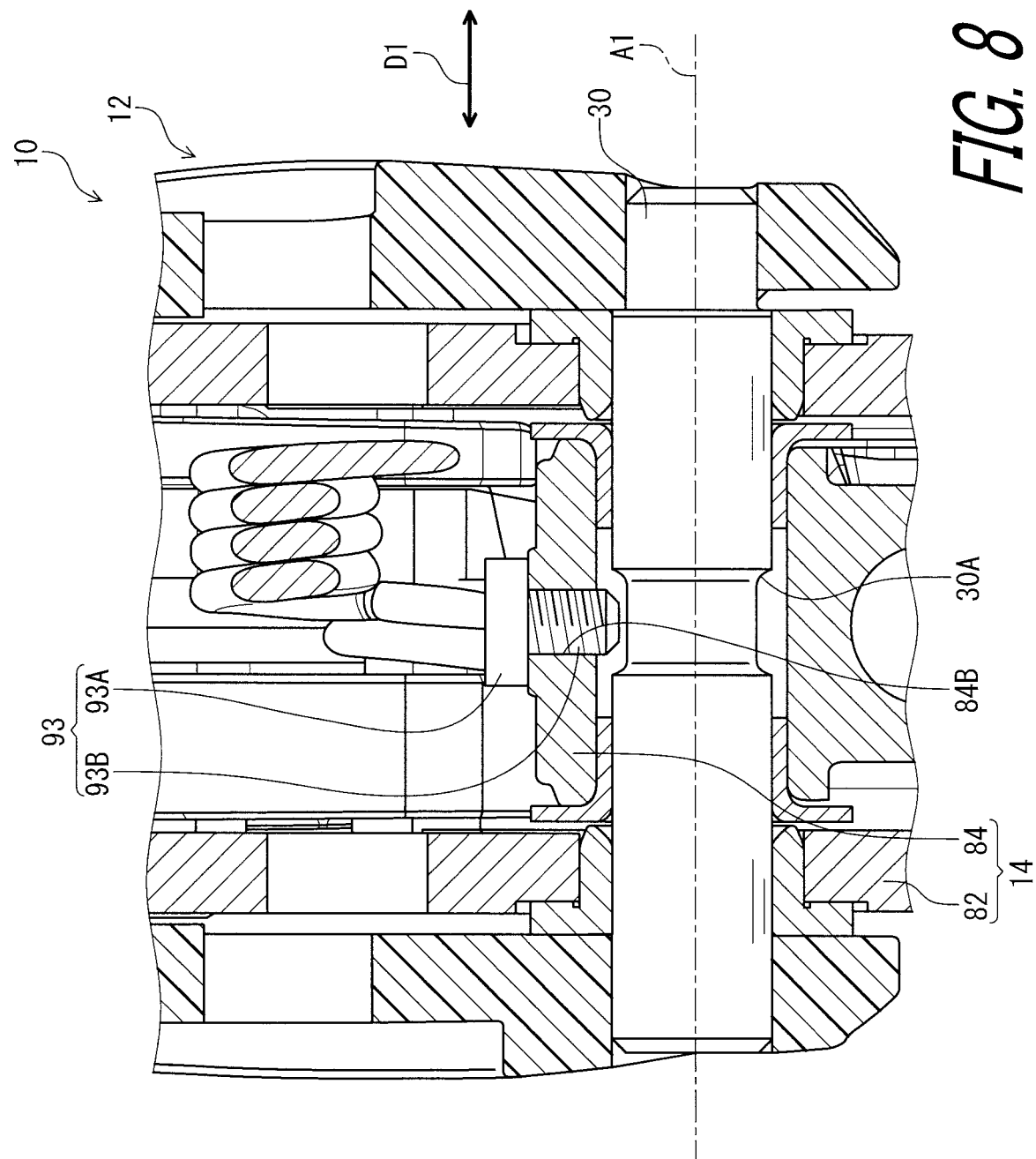
FIG. 8 is a cross-sectional view of the bicycle operating device taken along line VIII-VIII of FIG. 4.

As seen in FIG. 8, the pivot shaft 30 is secured to one of the base member 12 and the operating member 14. In this embodiment, the pivot shaft 30 is secured to the base member 12. However, the pivot shaft 30 can be secured to the operating member 14. The pivot shaft 30 includes a groove 30A extending about the pivot axis A1. The groove 30A has an annular shape. The bicycle operating device 10 comprises a restriction member 93 attached to the operating member 14 to restrict an axial movement of the pivot shaft 30 relative to the operating member 14. An end of the restriction member 93 is provided in the groove 30A of the pivot shaft 30 in a state where the restriction member 93 is attached to the operating member 14. In this embodiment, the restriction member 93 is attached to the intermediate body 84 of the operating member 14. Specifically, the intermediate body 84 includes a second threaded hole 84B. The restriction member 93 is a screw and includes a head part 93A and an externally threaded part 93B extending from the head part 93A. The externally threaded part 93B is threadedly engaged with the second threaded hole 84B of the intermediate body 84. An end of the externally threaded part 93B is provided in the groove 30A of the pivot shaft 30 in a state where the restriction member 93 is attached to the intermediate body 84. The restriction member 93 is rotatable relative to the pivot shaft 30 in response to a pivotal movement of the operating member 14 relative to the base member 12.

Figure 9:
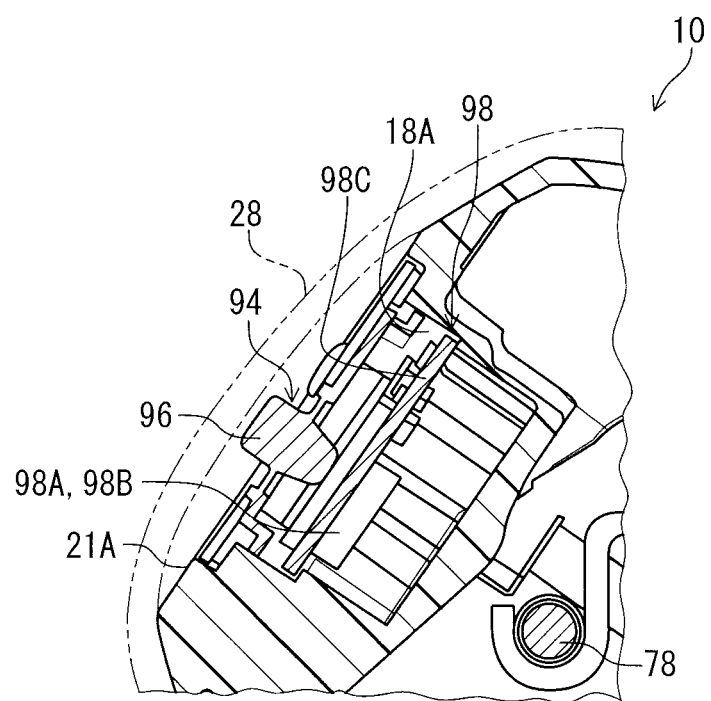
FIG. 9 is a partial cross-sectional view of the bicycle operating device taken along line IX-IX of FIG. 5.

As seen in FIG. 9, the bicycle operating device 10 comprises an electrical switch 94 provided at the second end portion 18. In this embodiment, the electrical switch 94 is attached to the pommel portion 21. However, the position of the electrical switch 94 is not limited to this embodiment. The electrical switch 94 includes a user operating portion 96. The user operating portion 96 forwardly upwardly faces in the mounting state where the base member 12 is mounted to the bicycle handlebar 2 (FIG. 4). The user operating portion 96 is arranged in the second end surface 21A. The user operating portion 96 protrudes from the second end surface 21A. In this embodiment, the electrical switch 94 is provided in an accommodation recess 18A of the second end portion 18 of the base member 12. The electrical switch 94 is covered by the grip cover 28 to be operated via the grip cover 28. The user operating portion 96 is covered by the grip cover 28 to be pushed via the grip cover 28. However, the user operating portion 96 can be exposed from the grip cover 28. The user operating portion 96 can be omitted from the electrical switch 94.

Figure 10:
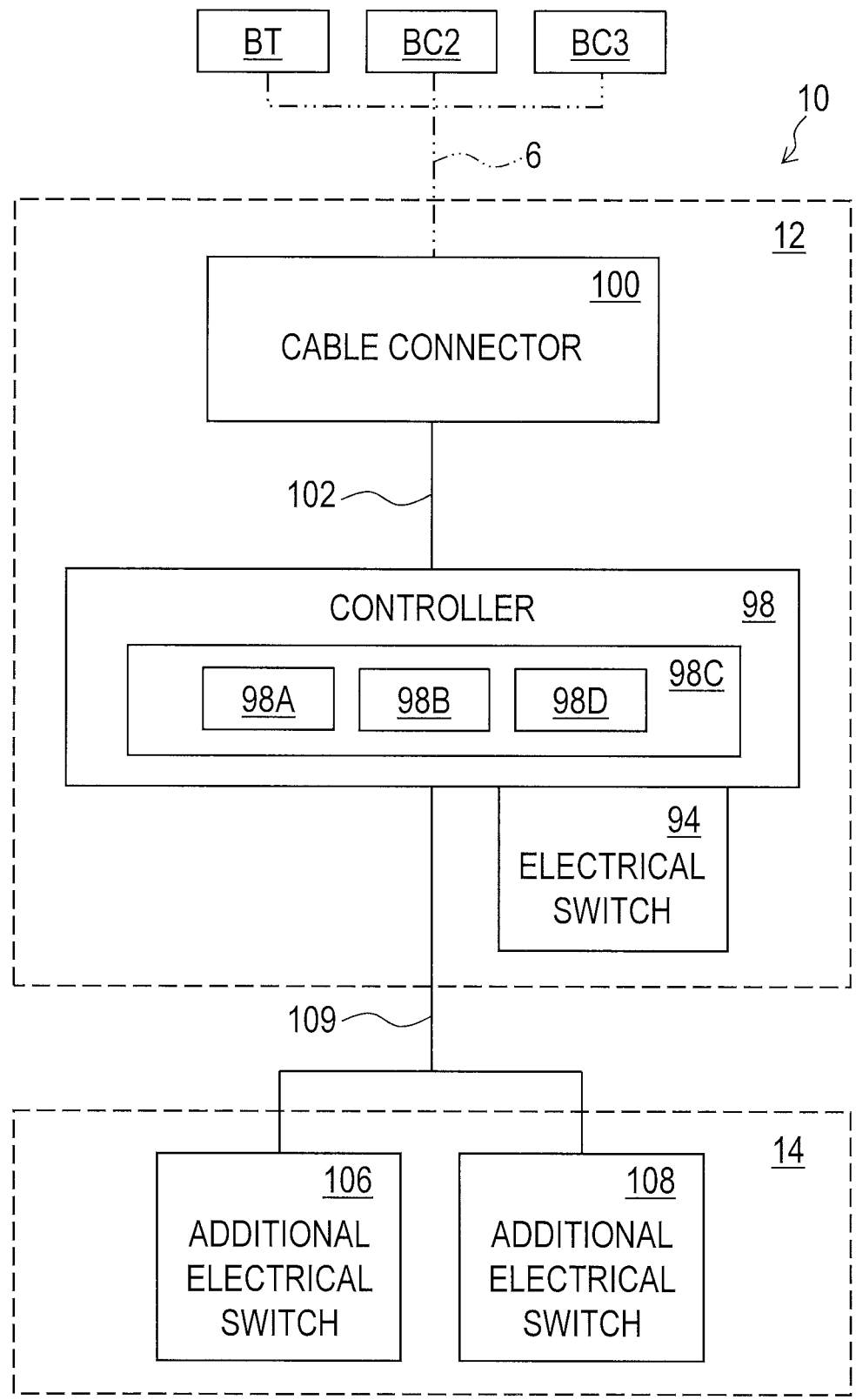
FIG. 10 is a block diagram of the bicycle operating device illustrated in FIG. 1.

As seen in FIG. 10, the bicycle operating device 10 further comprises a controller 98 electrically connected to the electrical switch 94 to generate a control signal based on an operation of the electrical switch 94. Examples of the control signal include a control signal to control the bicycle seatpost, the bicycle suspension, the bicycle shifting device, the cycle computer, and the smart phone. The controller 98 can be omitted from the bicycle operating device 10 or provided at a device other than the bicycle operating device 10.

As seen in FIG. 9, the electrical switch 94 is provided on the controller 98. The controller 98 is attached to the pommel portion 21. The controller 98 is provided in the accommodation recess 18A of the second end portion 18 of the base member 12.

As seen in FIG. 10, the controller 98 includes a processor 98A, a memory 98B, and a substrate 98C. The processor 98A and the memory 98B are electrically mounted on the substrate 98C. The processor 98A is electrically connected to the memory 98B via the substrate 98C. The processor 98A includes a central processing unit (CPU). The memory 98B stores programs and other information. The memory 98B includes a read only memory (ROM) and a random-access memory (RAM). For example, a program stored in the memory 98B is read into the processor 98A, and thereby several functions of the controller 98 are performed. The electrical switch 94 is electrically mounted on the substrate 98C. The electrical switch 94 is electrically connected to the processor 98A via the substrate 98C. As seen in FIG. 9, the substrate 98C is secured to the pommel portion 21.

As seen in FIG. 10, the bicycle operating device 10 further comprises a cable connector 100 provided at one of the base member 12 and the operating member 14. In this embodiment, the cable connector 100 is provided at the base member 12. However, the cable connector 100 can be provided at the operating member 14. The cable connector 100 is electrically connected to the controller 98 via a control cable 102. The cable connector 100 includes a connection port 104 (FIG. 2) to detachably receive the electrical control cable 6 to electrically connect the electrical control cable 6 to the controller 98. The cable connector 100 can be omitted from the bicycle operating device 10 or provided at a device other than the bicycle operating device 10.

The controller 98 is electrically connected to the electrical device BC2 and the additional device BC3 via the electrical control cable 6 using power line communication technology. Power line communication (PLC) carries data on a conductor that is also used simultaneously for electric power transmission or electric power distribution to the electrical device BC2 and the additional device BC3. The controller 98 includes a PLC controller 98D. The PLC controller 98D receives an input signal generated by the electrical switch 94. The PLC controller 98D superimposes the input signal on a power source voltage flowing in the electrical control cable 6. The power source voltage is supplies from a battery BT via the electrical control cable 6.

As seen in FIG. 1, the bicycle operating device 10 further comprises an additional electrical switch 106 provided at one of the base member 12 and the operating member 14. In this embodiment, the additional electrical switch 106 is provided at the operating member 14. The additional electrical switch 106 receives one of a user upshift input and a user downshift input. However, the additional electrical switch 106 can be omitted from the bicycle operating device 10.

The bicycle operating device 10 further comprises an additional electrical switch 108 provided at one of the base member 12 and the operating member 14. In this embodiment, the additional electrical switch 108 is provided at the operating member 14. The additional electrical switch 108 receives the other of the user upshift input and the user downshift input. However, the additional electrical switch 108 can be omitted from the bicycle operating device 10.

As seen in FIG. 10, the additional electrical switch 106 is electrically connected to the controller 98. The additional electrical switch 108 is electrically connected to the controller 98. In this embodiment, the additional electrical switches 106 and 108 are electrically connected to the controller 98 via a control cable 109. The controller 98 respectively generates an upshift control signal and a downshift control signal based on the user upshift input and the user downshift input. The controller 98 can be configured to respectively control separate devices in response to control signals generated based on the electrical switch 94, the additional electrical switch 106, and the additional electrical switch 108. The controller 98 can be configured to control one device in response to control signals generated based on at least two of the electrical switch 94, the additional electrical switch 106, and the additional electrical switch 108.

As seen in FIGS. 11 to 14, the base member 12 is integrally provided as a one-piece unitary member. The base member 12 is made of a resin material. Examples of the resin material include a synthetic resin. The base member 12 is formed in a molding process, for example. The base member 12 includes an outer surface 110. The outer surface 110 is at least partly covered with the grip cover 28 (FIG. 1).

Figure 15:
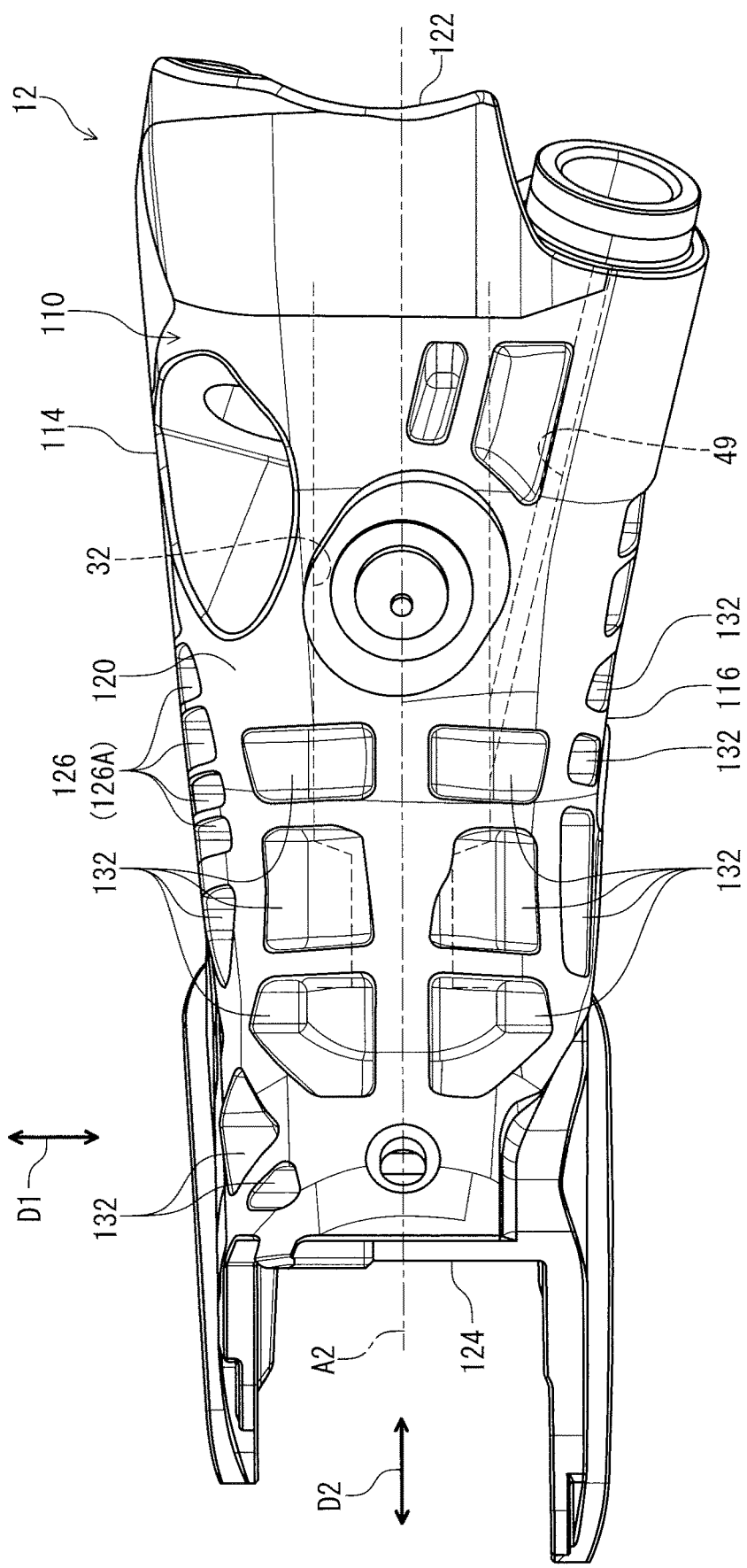
FIG. 15 is a top view of the base member of the bicycle operating device illustrated in FIG. 1.
Figure 16:
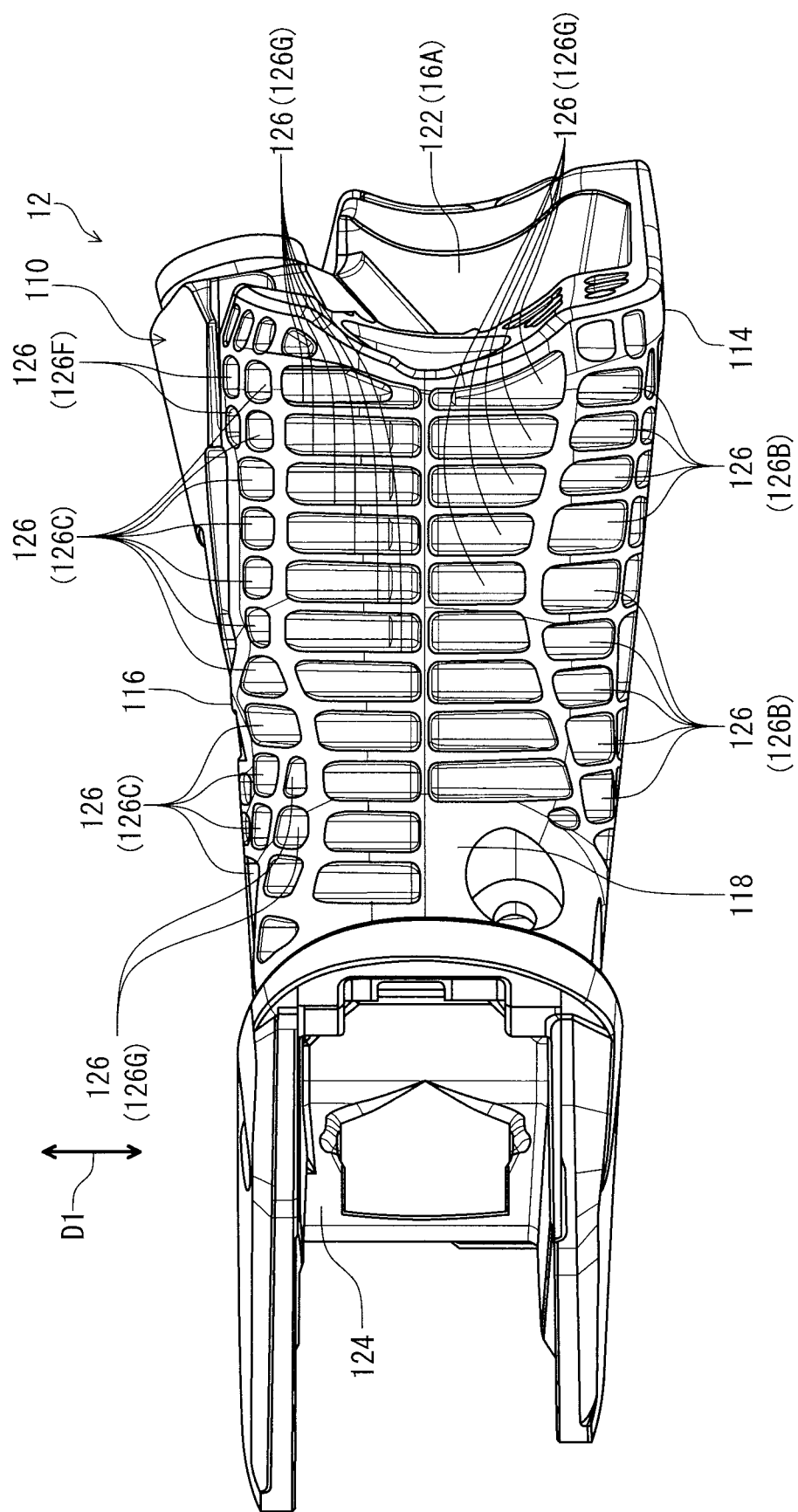
FIG. 16 is a bottom view of the base member of the bicycle operating device illustrated in FIG. 1.

In this embodiment, the outer surface 110 includes a first surface 114, a second surface 116, a third surface 118, a fourth surface 120, a fifth surface 122, and a sixth surface 124. As seen in FIGS. 15 and 16, the second surface 116 is provided on a reverse side of the first surface 114. The first surface 114 faces in the axial direction D1 and constitutes a lateral surface of the base member 12. The second surface 116 faces in the axial direction D1 and constitute another lateral surface of the base member 12. The third surface 118 extends between the first surface 114 and the second surface 116.

Figure 14:
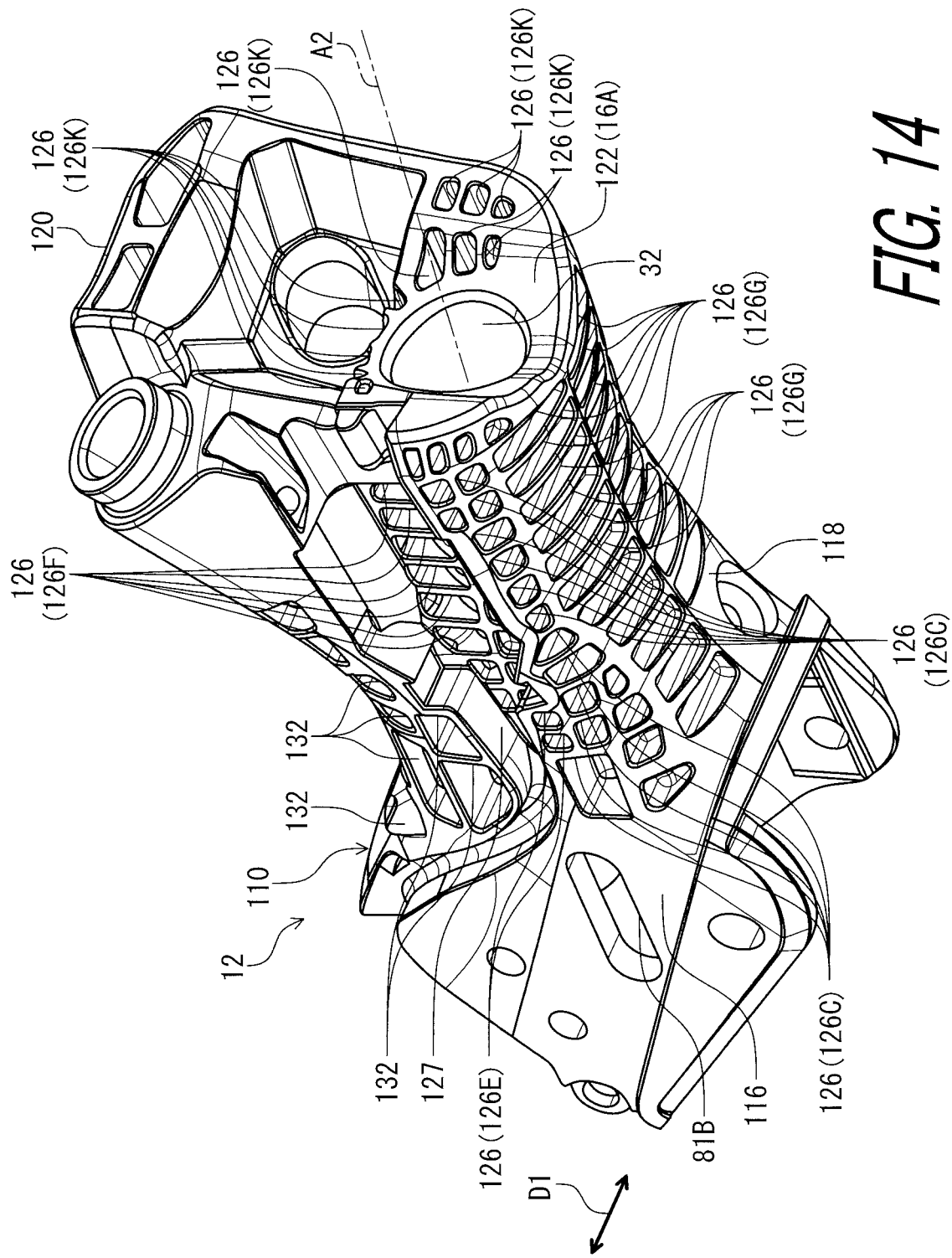
FIG. 14 is another perspective view of the base member of the bicycle operating device illustrated in FIG. 1.
Figure 17:
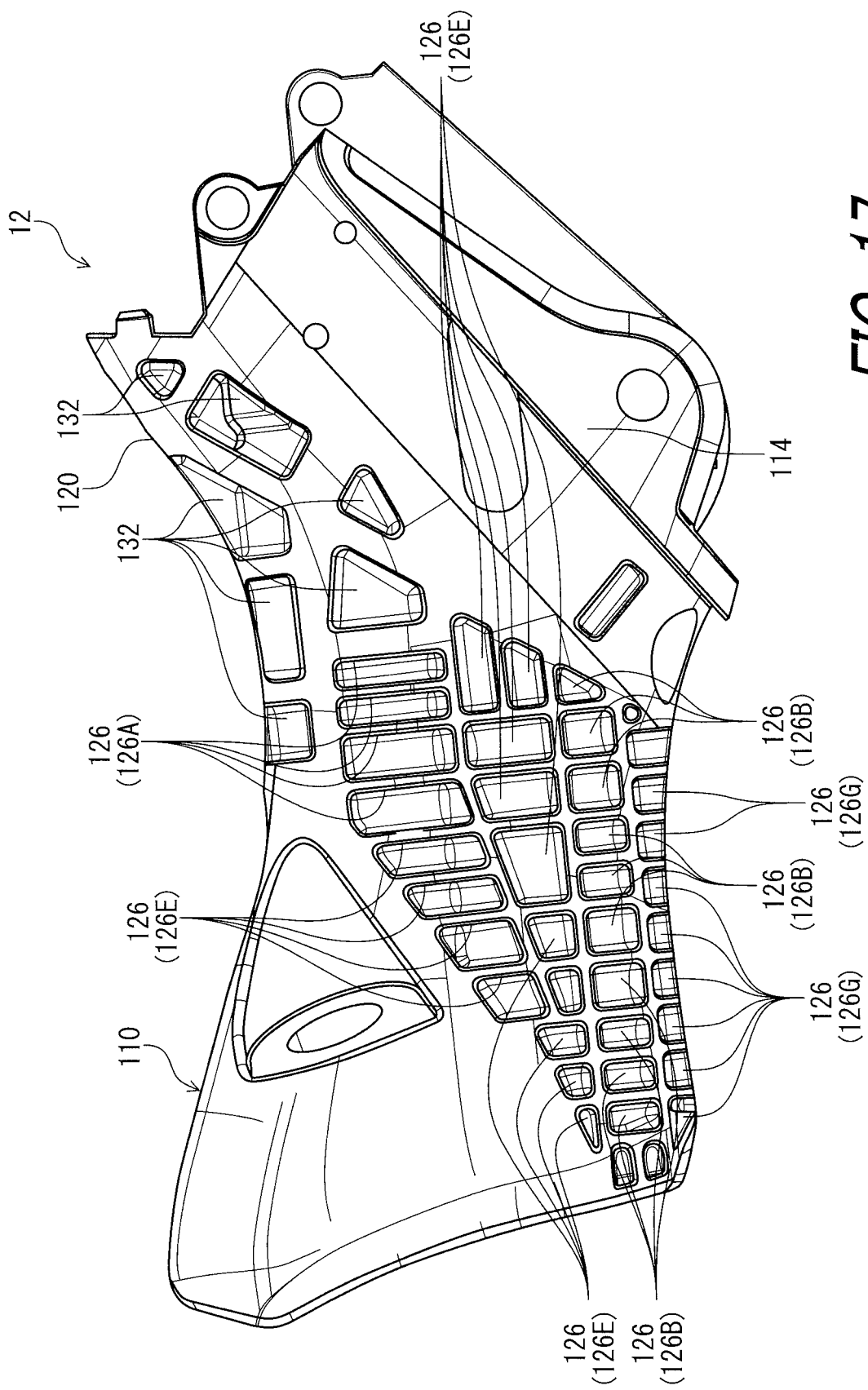
FIG. 17 is a side elevational view of the base member of the bicycle operating device illustrated in FIG. 1.
Figure 18:
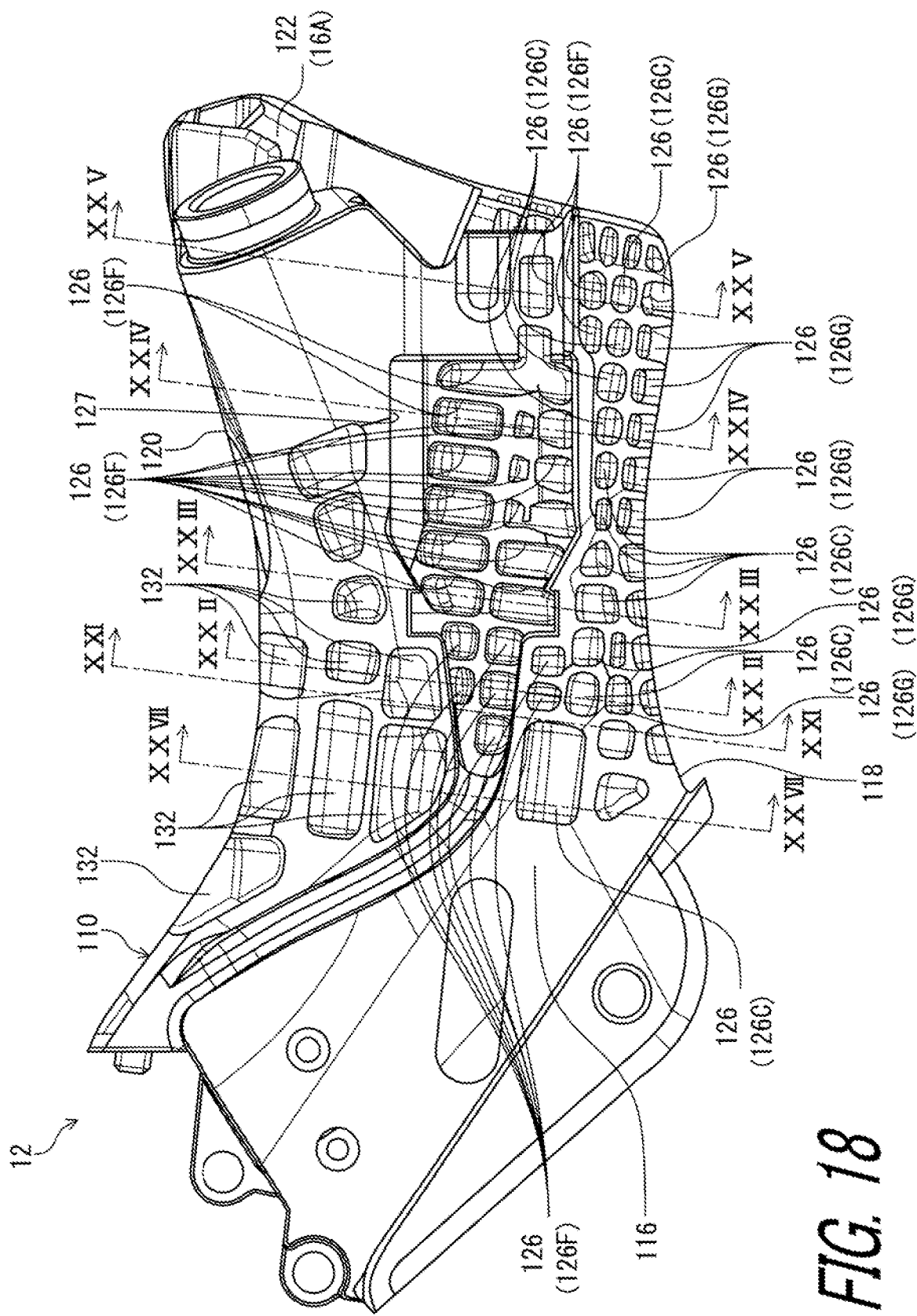
FIG. 18 is another side elevational view of the base member of the bicycle operating device illustrated in FIG. 1.

As seen in FIGS. 17 and 18, the fourth surface 120 is provided on a reverse side of the third surface 118. The third surface 118 constitutes a lower surface of the base member 12. The fourth surface 120 constitutes an upper surface of the base member 12. As seen in FIG. 14, the fourth surface 120 extends between the first surface 114 and the second surface 116.

Figure 19:
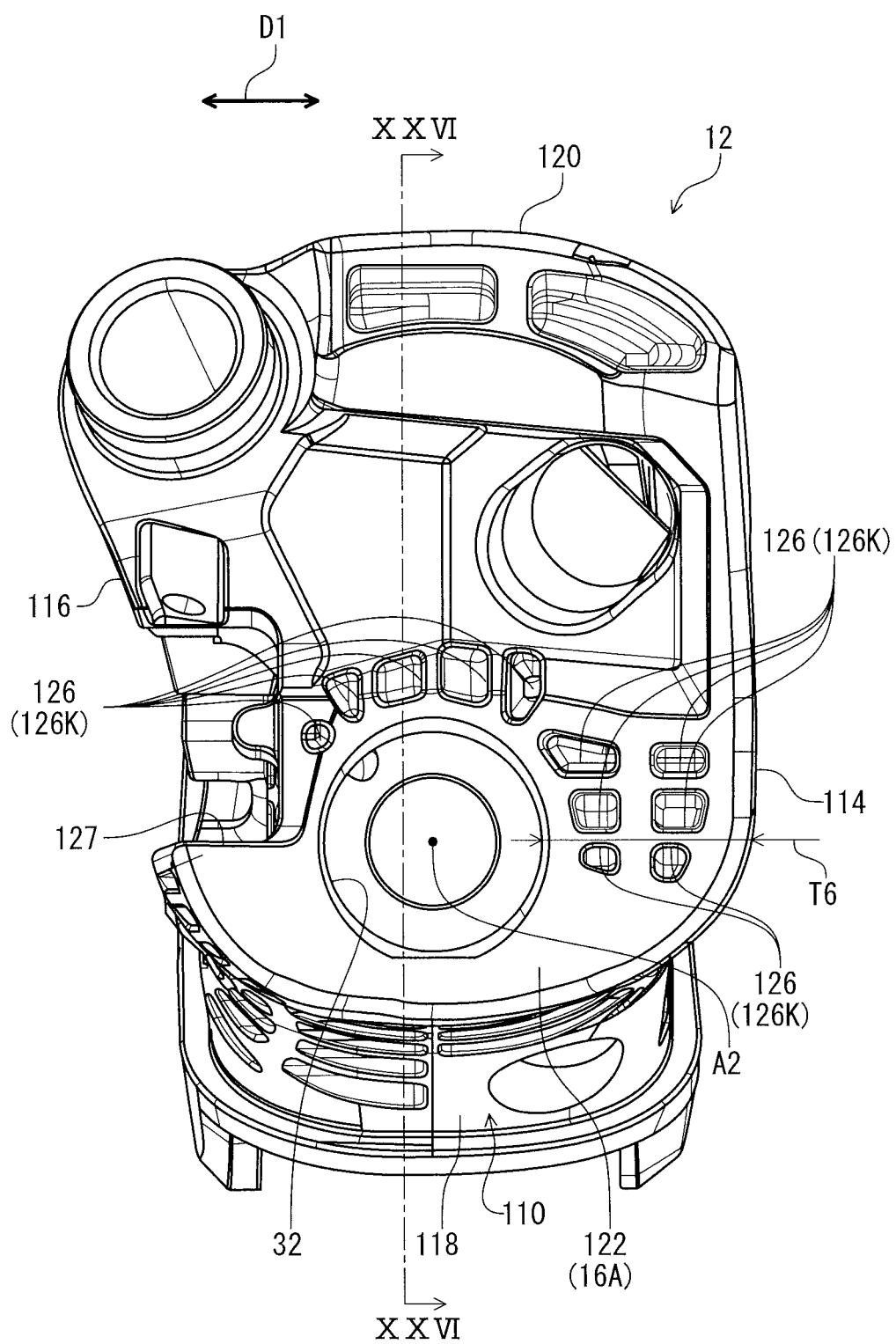
FIG. 19 is a rear view of the base member of the bicycle operating device illustrated in FIG. 1.

As seen in FIG. 19, the fifth surface 122 extends between the first surface 114 and the second surface 116 and between the third surface 118 and the fourth surface 120. In this embodiment, the fifth surface 122 includes the first end surface 16A of the base member 12. Namely, the fifth surface 122 is contactable with the bicycle handlebar 2 (FIG. 1). The cylinder bore 32 is provided between the first surface 114 and the second surface 116 and between the third surface 118 and the fourth surface 120 as viewed along the cylinder center axis A2.

As seen in FIG. 15, the sixth surface 124 is provided on a reverse side of the fifth surface 122. The sixth surface 124 is provided on a reverse side of the fifth surface 122 in a cylinder axis direction D2 of the cylinder center axis A2. As seen in FIGS. 15 and 16, each of the first surface 114, the second surface 116, the third surface 118, and the fourth surface 120 extends between the fifth surface 122 and the sixth surface 124 in the cylinder axis direction D2. As seen in FIG. 19, the sixth surface 124 extends between the first surface 114 and the second surface 116 and between the third surface 118 and the fourth surface 120.

As seen in FIGS. 11 to 14, the base member 12 includes at least one recess 126. In this embodiment, the at least one recess 126 includes recesses 126. However, a total number of the recesses 126 is not limited to this embodiment. The at least one recess 126 is provided on at least two of the first surface 114, the second surface 116, the third surface 118, the fourth surface 120, the fifth surface 122, and the sixth surface 124. The recesses 126 are provided on the first surface 114, the second surface 116, the third surface 118, the fourth surface 120, the fifth surface 122, and the sixth surface 124. At least two of the recesses 126 are arranged in the cylinder axis direction D2. At least three of the recesses 126 are preferably arranged in the cylinder axis direction D2. At least five of the recesses 126 are more preferably arranged in the cylinder axis direction D2. Furthermore, at least two of the recesses 126 are arranged in the axial direction D1 and/or a circumferential direction of the cylinder bore 32. At least three of the recesses 126 are preferably arranged in the circumferential direction of the cylinder bore 32. At least five of the recesses 126 are more preferably arranged in the circumferential direction of the cylinder bore 32. However, positions of the recesses 126 is not limited to this embodiment.

Figure 11:
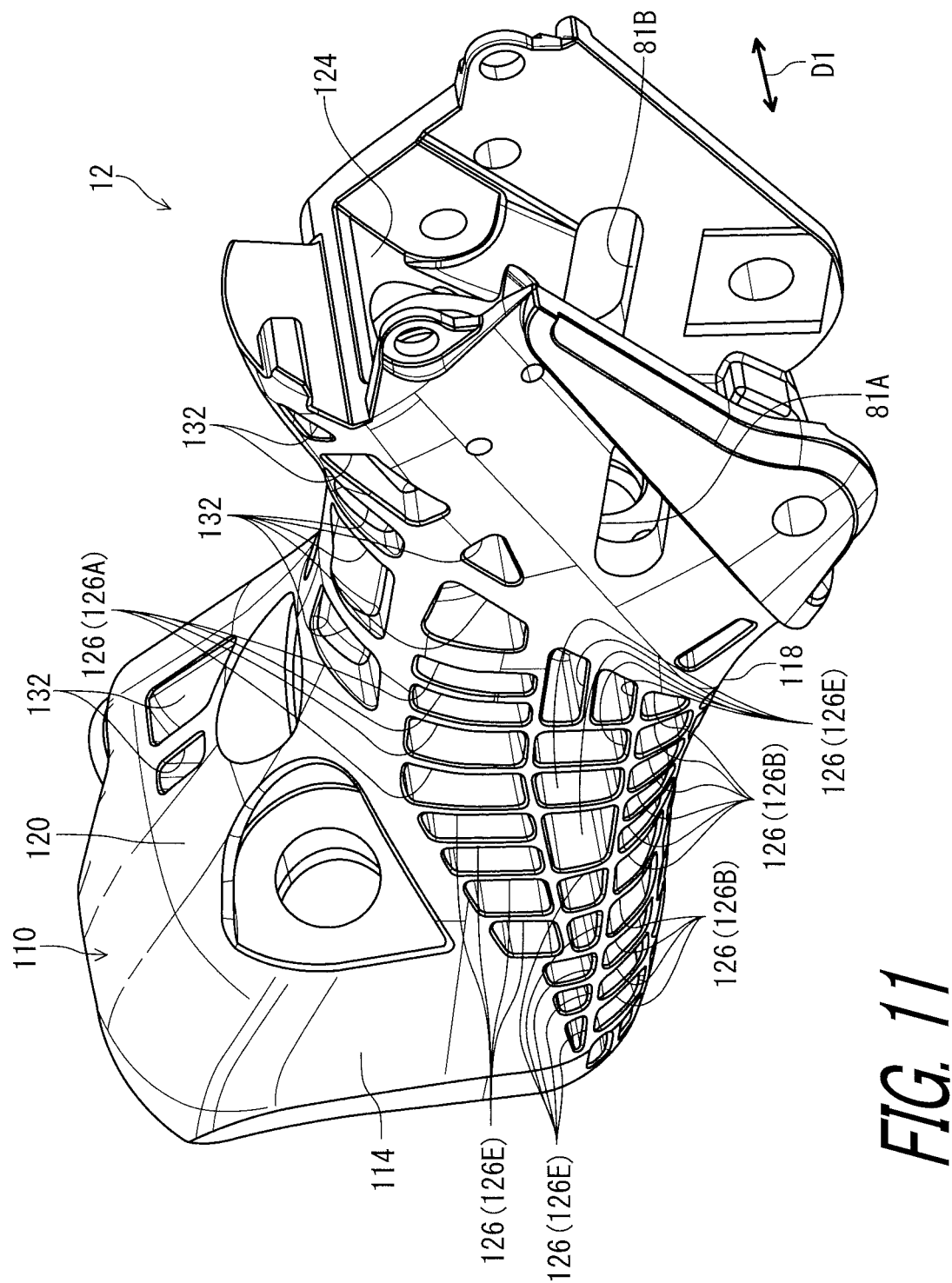
FIG. 11 is a perspective view of the base member of the bicycle operating device illustrated in FIG. 1.
Figure 12:
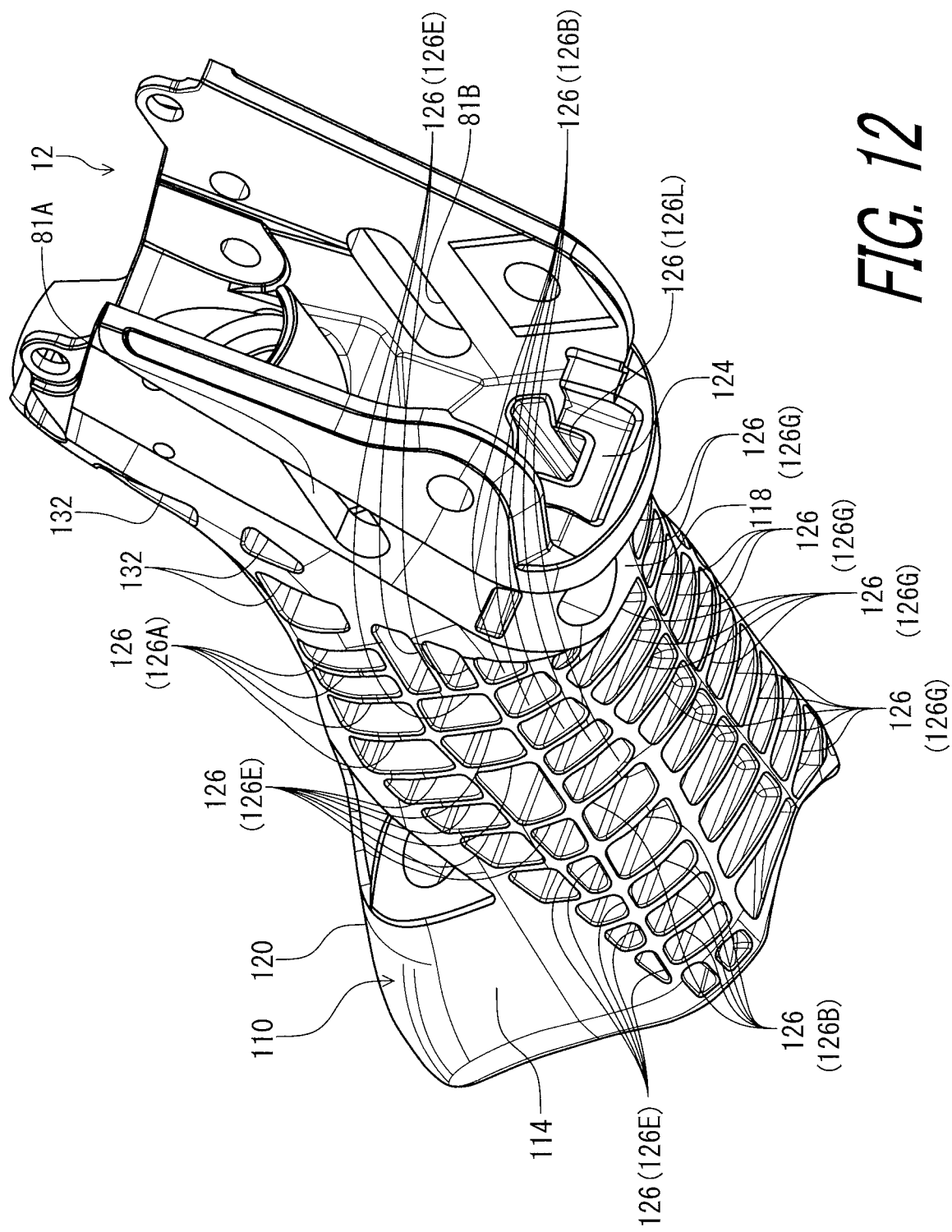
FIG. 12 is another perspective view of the base member of the bicycle operating device illustrated in FIG. 1.

The at least one recess 126 includes at least one continuous recess continuously provided on at least two of the first surface 114, the second surface 116, the third surface 118, the fourth surface 120, the fifth surface 122, and the sixth surface 124. In this embodiment, the recesses 126 includes continuous recesses 126A, 126B, and 126C continuously provided on at least two of the first surface 114, the second surface 116, the third surface 118, the fourth surface 120, the fifth surface 122, and the sixth surface 124. As seen in FIG. 11, the continuous recess 126A is continuously provided on the first surface 114 and the fourth surface 120. As seen in FIG. 12, the continuous recess 126B is continuously provided on the first surface 114 and the third surface 118. As seen in FIG. 14, the continuous recess 126C is continuously provided on the second surface 116 and the third surface 118. At least one of the continuous recesses 126A, 126B, and 126C can be omitted from the base member 12.

As seen in FIGS. 11 to 14, the at least one recess 126 includes at least one first recess 126E and at least one second recess 126F. The at least one first recess 126E is provided on one of the at least two of the first surface 114, the second surface 116, the third surface 118, the fourth surface 120, the fifth surface 122, and the sixth surface 124. The at least one second recess 126F is provided on another of the at least two of the first surface 114, the second surface 116, the third surface 118, the fourth surface 120, the fifth surface 122, and the sixth surface 124. In this embodiment, the at least one first recess 126E includes a plurality of first recesses 126E, and the at least one second recess 126F includes a plurality of second recesses 126F. The first recesses 126E are provided on the first surface 114. The second recesses 126F are provided on the second surface 116. The at least one second recess 126F is separate from the at least one first recess 126E. In this embodiment, the second recesses 126F are separate from the first recesses 126E.

The at least one recess 126 includes at least one third recess 126G. The at least one third recess 126G is provided on the third surface 118. In this embodiment, the at least one third recess 126G includes a plurality of third recesses 126G. The third recesses 126G are provided on the third surface 118. The third recesses 126G are separate from the first recesses 126E and the second recesses 126F.

Figure 13:
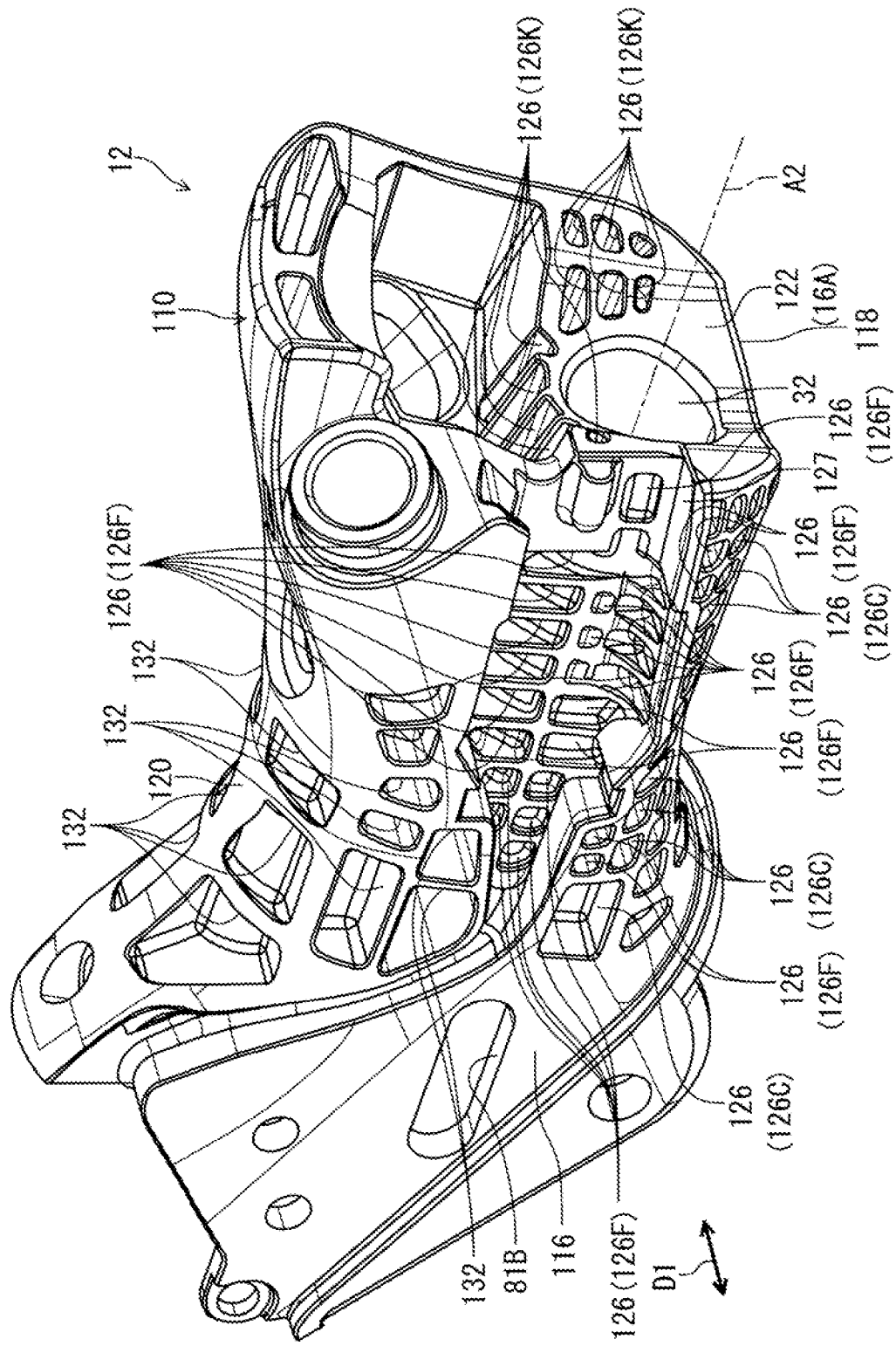
FIG. 13 is another perspective view of the base member of the bicycle operating device illustrated in FIG. 1.

As seen in FIGS. 13 and 14, the base member 12 includes an accommodation groove 127. As seen in FIGS. 2 and 3, the cable connector 100 and the control cable 102 are provided in the accommodation groove 127. At least one of the second recesses 126F is provided in the accommodation groove 127.

Figure 20:
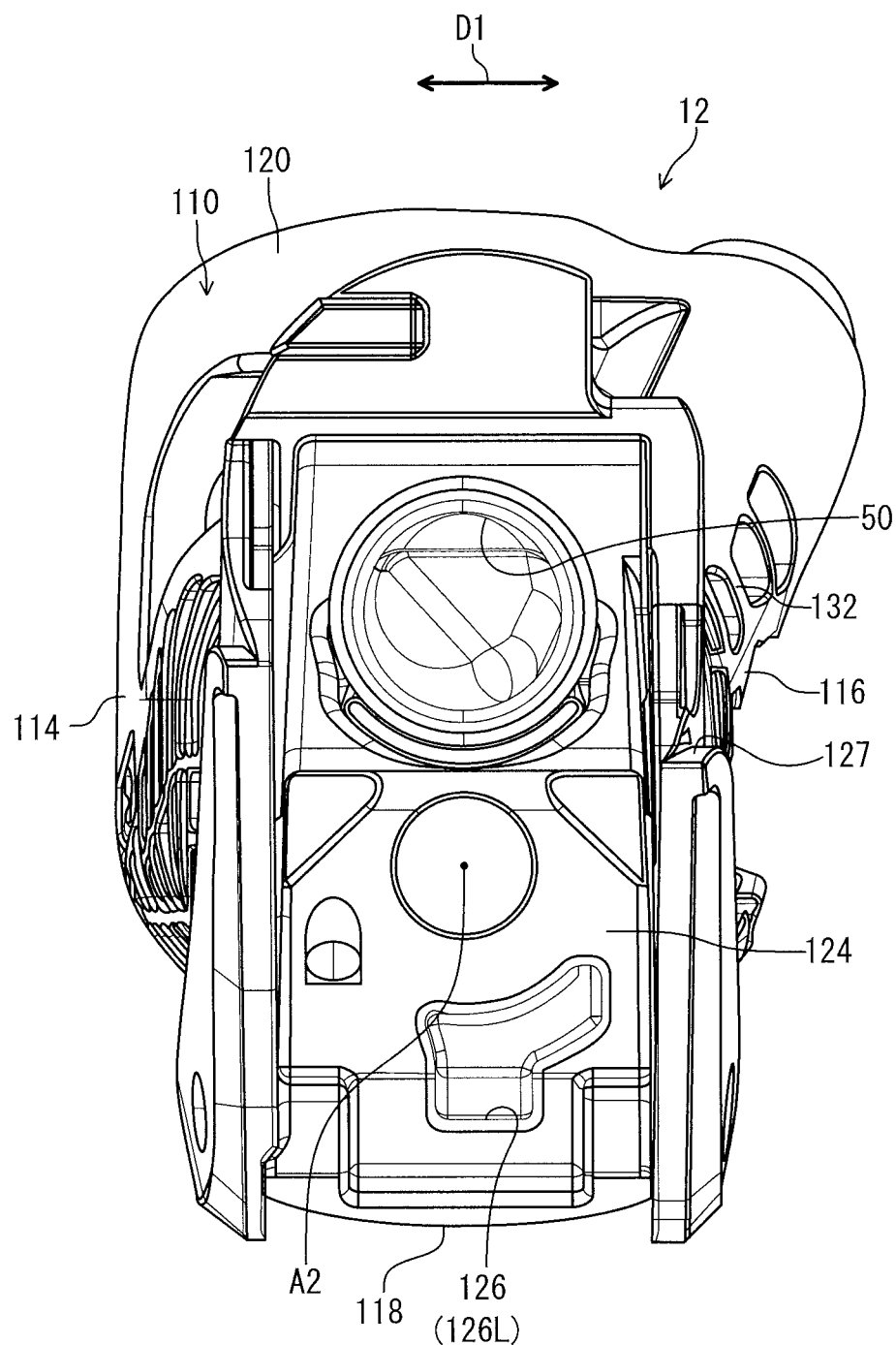
FIG. 20 is a front view of the base member of the bicycle operating device illustrated in FIG. 1.

As seen in FIGS. 12 to 14 and 20, the at least one recess 126 includes at least one fifth recess 126K and at least one sixth recess 126L. In this embodiment, for example, the at least one fifth recess 126K includes a plurality of fifth recesses 126K, and the at least one sixth recess 126L includes a single sixth recess 126L. As seen in FIGS. 13 and 14, the fifth recesses 126K are provided on the fifth surface 122. As seen in FIGS. 12 and 20, the sixth recess 126L is provided on the sixth surface 124. The fifth recesses 126K are separate from the first recesses 126E, the second recesses 126F, and the third recesses 126G. The sixth recess 126L is separate from the first recesses 126E, the second recesses 126F, the third recesses 126G, and the fifth recesses 126K.

As seen in FIGS. 21 to 25, the at least one recess 126 defines a cylinder wall 128 between the cylinder bore 32 and the at least one recess 126. The at least one recess 126 is provided on the outer surface 110 to define the cylinder wall 128 between the cylinder bore 32 and the at least one recess 126. In this embodiment, the recesses 126 are each provided on the outer surface 110 to define the cylinder wall 128 between the cylinder bore 32 and the recesses 126. The cylinder wall 128 defines the cylinder bore 32.

The cylinder wall 128 has a cylinder-wall thickness T1 defined between the cylinder bore 32 and the at least one recess 126. The cylinder-wall thickness T1 is defined between the cylinder bore 32 and the recesses 126. The cylinder-wall thickness T1 is defined as a thickness of the cylinder wall 128 in a radial direction of the cylinder bore 32 and is defined radially outwardly from the cylinder bore 32. The cylinder-wall thickness T1 is defined between the cylinder bore 32 and the recesses 126. The cylinder-wall thickness T1 is equal to or larger than 1 mm and equal to or smaller than 3.5 mm. The cylinder-wall thickness T1 is preferably equal to or larger than 1.5 mm and equal to or smaller than 3 mm. In this embodiment, the cylinder-wall thickness T1 is equal to 2 mm. However, the cylinder-wall thickness T1 is not limited to this embodiment. The cylinder-wall thickness T1 can be at least partly uneven at positions corresponding to the recesses 126. In such an embodiment, radial positions of bottoms of the recesses 126 are at least partly uneven relative to the cylinder bore 32. In a case where the thickness of the cylinder wall 128 is uneven, for example, the cylinder-wall thickness T1 is defined as a maximum thickness of the cylinder wall 128 defined in the radial direction of the cylinder bore 32.

The cylinder bore 32 has an inner diameter DM1. The inner diameter DM1 is set within a range from 6 mm to 15 mm. Preferably, the inner diameter DM1 is set within a range from 9 mm to 12 mm. In this embodiment, the inner diameter DM1 is 12 mm. A ratio of the cylinder-wall thickness T1 to the inner diameter DM1 is equal to or larger than 5% and equal to or smaller than 40%. However, the ratio of the cylinder-wall thickness T1 to the inner diameter DM1 is not limited to this embodiment.

The base member 12 includes at least one rib 130. In this embodiment, the at least one rib 130 includes a plurality of ribs 130. The at least one rib 130 is provided between adjacent two of the recesses 126. The at least one rib 130 has a thickness T2 equal to or larger than 0.2 mm and equal to or smaller than 3 mm. The thickness T2 of the rib 130 is preferably equal to or larger than 0.4 mm and equal to or smaller than 2 mm. In this embodiment, the thickness T2 of the rib 130 is equal to 1 mm. In another embodiment, for example, the thickness T2 of the rib 130 can be equal to 0.45 mm. Furthermore, the thickness T2 of the rib 130 is equal to or smaller than the cylinder-wall thickness T1. However, the thickness T2 of the rib 130 is not limited to this embodiment. A total number of the ribs 130 is not limited to this embodiment. The thickness T2 of the ribs 130 can be at least partly uneven at positions corresponding to the ribs 130.

As seen in FIGS. 21 to 25, at least one of the at least one recess 126 extends from the outer surface 110 toward the cylinder bore 32. In this embodiment, each of the continuous recesses 126A, 126B and 126C, the first recesses 126E, the second recessed 126F, and the third recessed 126G extends from the outer surface 110 toward the cylinder bore 32. Each of these recesses 126A, 126B, 126C, 126E, 126F, and 126G includes a bottom surface. The bottom surfaces of these recesses constitute an outer peripheral surface of the cylinder wall 128.

Figure 26:
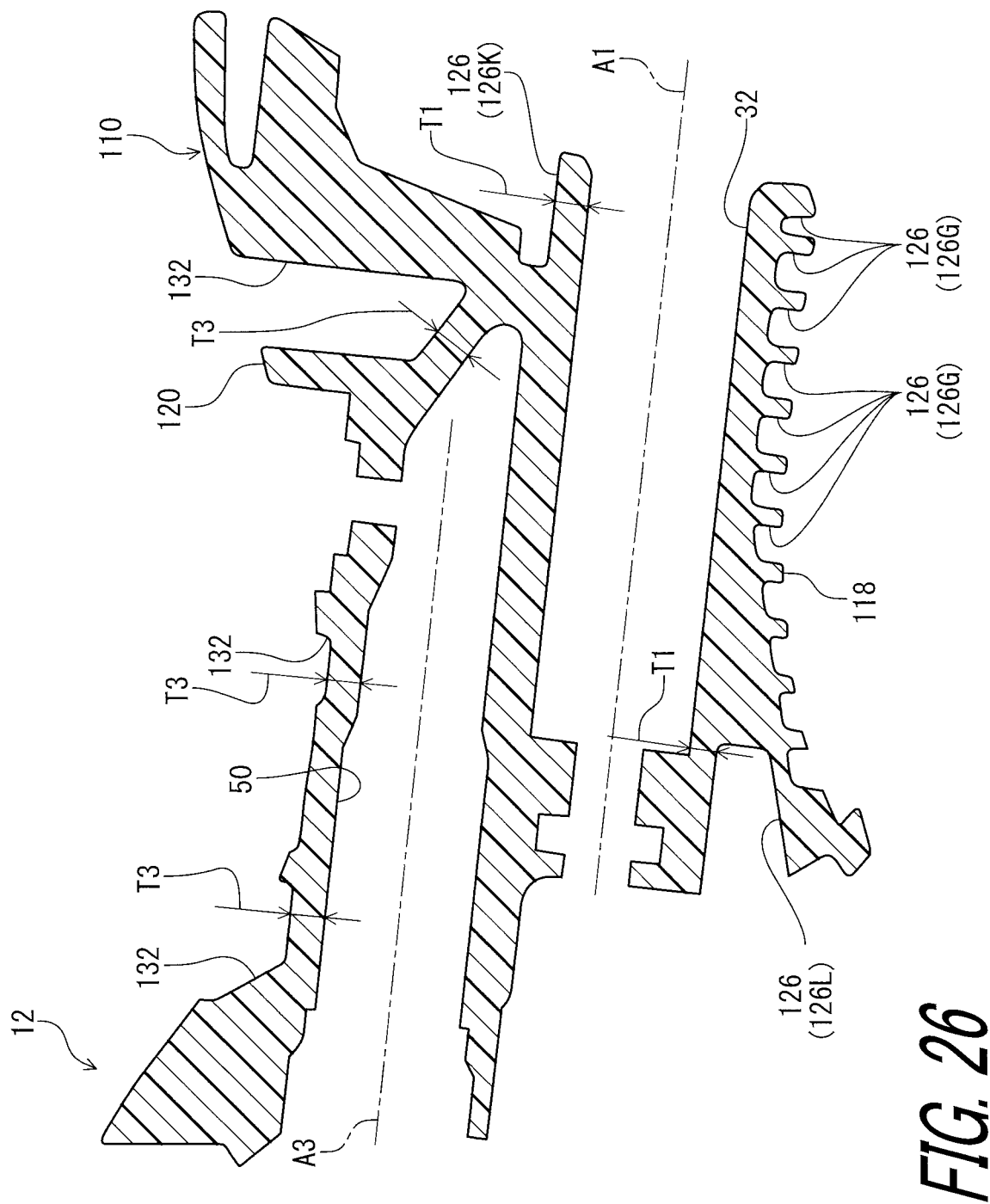
FIG. 26 is a cross-sectional view of the base member taken along line XXVI-XXVI of FIG. 19.
Figure 27:
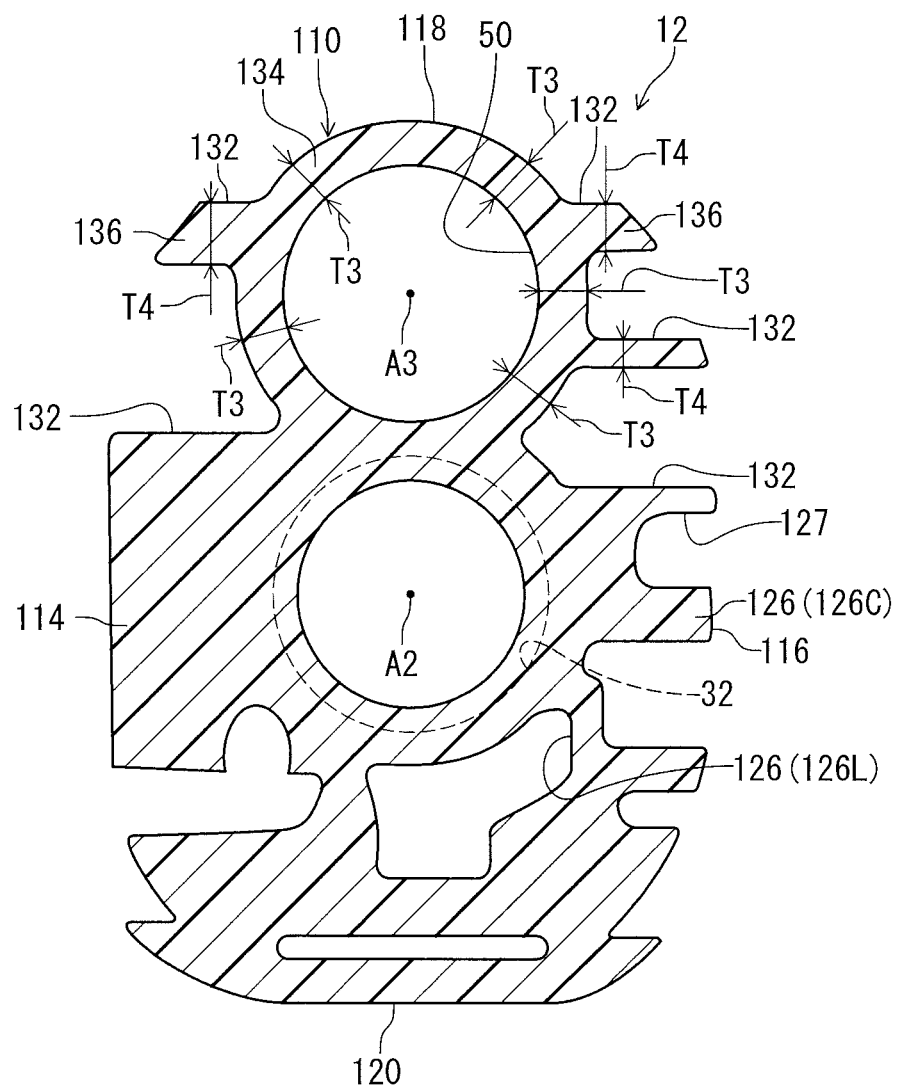
FIG. 27 is a cross-sectional view of the base member taken along line XXVII-XXVII of FIG. 18.

As seen in FIG. 26, at least one of the at least one recess 126 extends along the cylinder center axis A2 of the cylinder bore 32. In this embodiment, each of the fifth recesses 126K and the sixth recess 126L extends along the cylinder center axis A2 of the cylinder bore 32. Each of the fifth recesses 126K and the sixth recess 126L includes an inner peripheral surface. The inner peripheral surfaces of the fifth recesses 126K and the sixth recess 126L constitute the outer peripheral surface of the cylinder wall 128.

As seen in FIGS. 11 to 14, the base member 12 includes at least one additional recess 132. As seen in FIGS. 21 to 27, the at least one additional recess 132 defines a reservoir wall 134 between the reservoir bore 50 and the at least one additional recess 132. The at least one additional recess 132 is provided on the outer surface 110 to define the reservoir wall 134 between the reservoir bore 50 and the at least one additional recess 132. In this embodiment, the at least one additional recess 132 includes additional recesses 132 each provided on the outer surface 110 to define the reservoir wall 134 between the reservoir bore 50 and the additional recesses 132. The reservoir wall 134 defines the reservoir bore 50.

As seen in FIGS. 21 to 27, the reservoir wall 134 has a reservoir-wall thickness T3 defined between the reservoir bore 50 and the at least one additional recess 132. In this embodiment, the reservoir-wall thickness T3 is defined between the reservoir bore 50 and the additional recesses 132. The reservoir-wall thickness T3 is defined as a thickness of the reservoir wall 134 in a radial direction of the reservoir bore 50 and is defined radially outwardly from the reservoir bore 50. The cylinder-wall thickness T1 is equal to or smaller than the reservoir-wall thickness T3. The reservoir-wall thickness T3 is equal to or larger than 0.5 mm and equal to or smaller than 6 mm. The reservoir-wall thickness T3 is preferably equal to or larger than 1.5 mm and equal to or smaller than 3 mm. In this embodiment, the reservoir-wall thickness T3 is equal to 2 mm. Namely, the reservoir-wall thickness T3 is substantially equal to the cylinder-wall thickness T1. However, the reservoir-wall thickness T3 is not limited to this embodiment. The reservoir-wall thickness T3 can be at least partly uneven at positions corresponding to the additional recesses 132. In such an embodiment, radial positions of bottoms of the additional recesses 132 are at least partly uneven relative to the reservoir bore 50. In a case where the thickness of the reservoir wall 134 is uneven, for example, the reservoir-wall thickness T3 is defined as a maximum thickness of the reservoir wall 134 defined in the radial direction of the reservoir bore 50.

The base member 12 includes at least one additional rib 136. In this embodiment, the at least one additional rib 136 includes a plurality of additional ribs 136. The at least one additional rib 136 is provided between adjacent two of the additional recesses 132. The at least one additional rib 136 has a thickness T4 equal to or larger than 0.2 mm and equal to or smaller than 3 mm. The thickness T4 of the additional rib 136 is preferably equal to or larger than 0.4 mm and equal to or smaller than 2 mm. In this embodiment, the thickness T4 of the additional rib 136 is equal to 1 mm. In another embodiment, for example, the thickness T4 of the additional rib 136 can be equal to 0.45 mm. Furthermore, the thickness T4 of the additional rib 136 is equal to or smaller than the reservoir-wall thickness T3. However, the thickness T4 of the additional rib 136 is not limited to this embodiment. A total number of the additional ribs 136 is not limited to this embodiment. The thickness T4 of the additional ribs 136 can be at least partly uneven at positions corresponding to the additional ribs 136.

Figure 21:
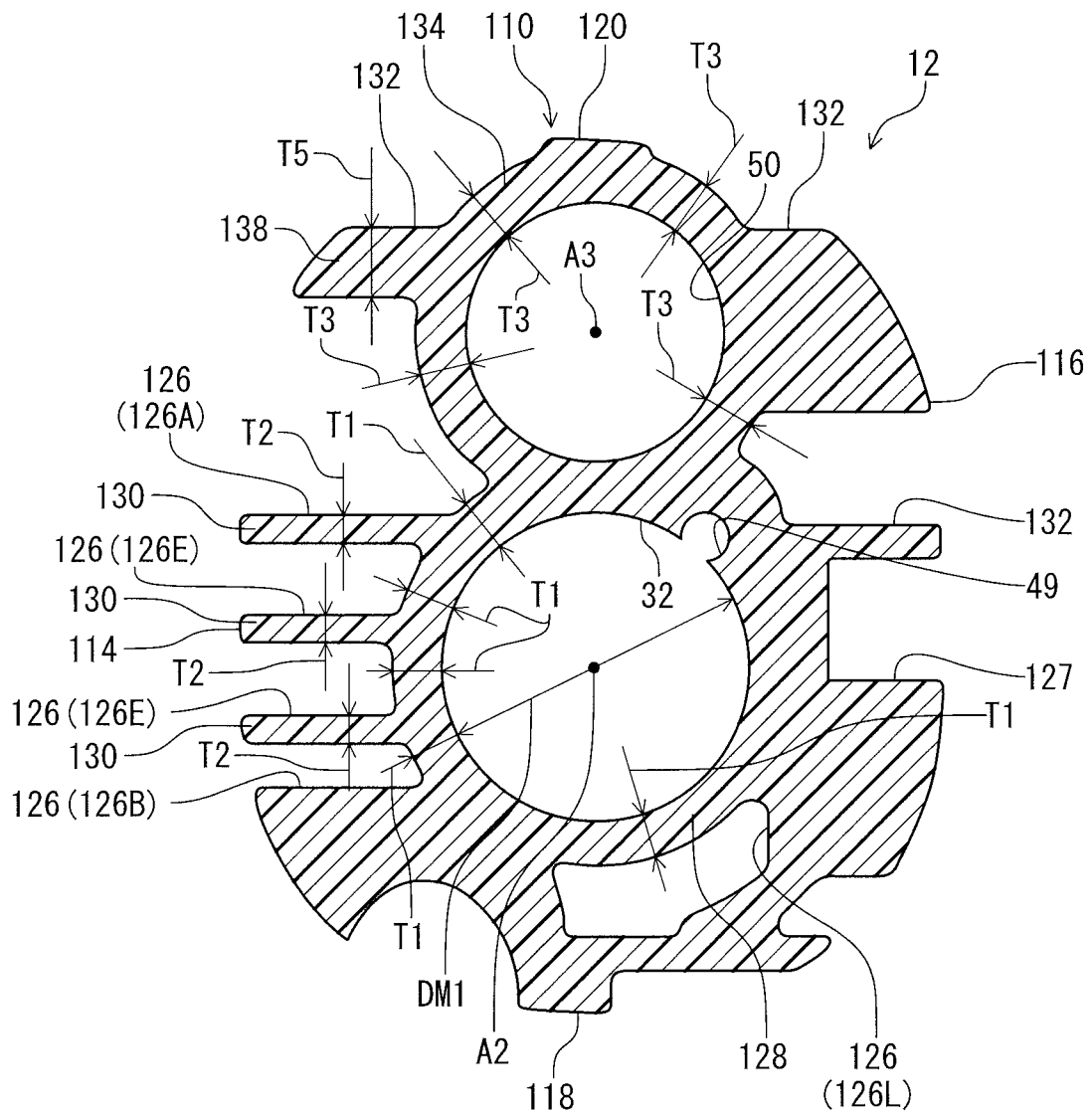
FIG. 21 is a cross-sectional view of the base member taken along line XXI-XXI of FIG. 18.
Figure 22:
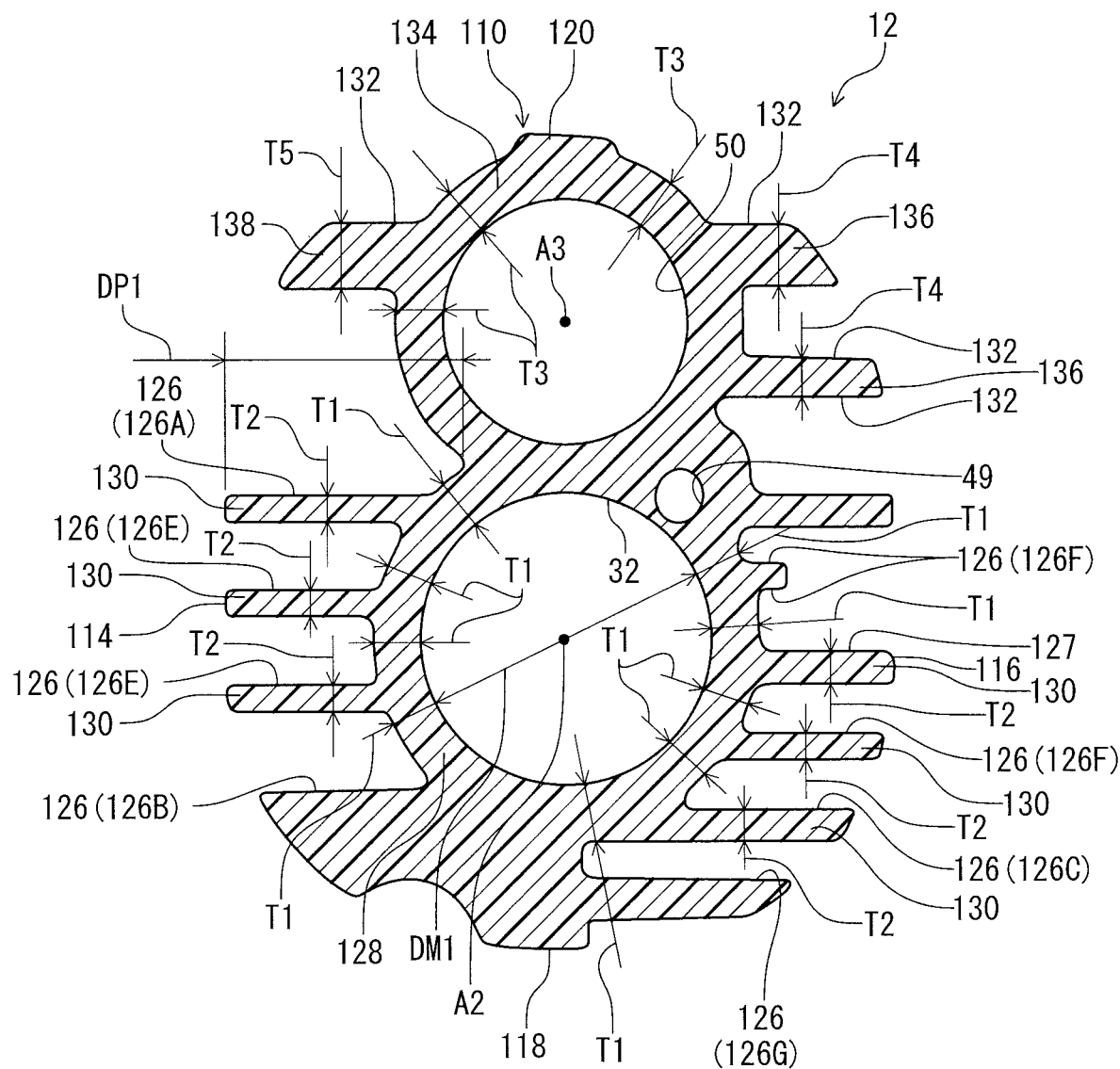
FIG. 22 is a cross-sectional view of the base member taken along line XXII-XXII of FIG. 18.
Figure 23:
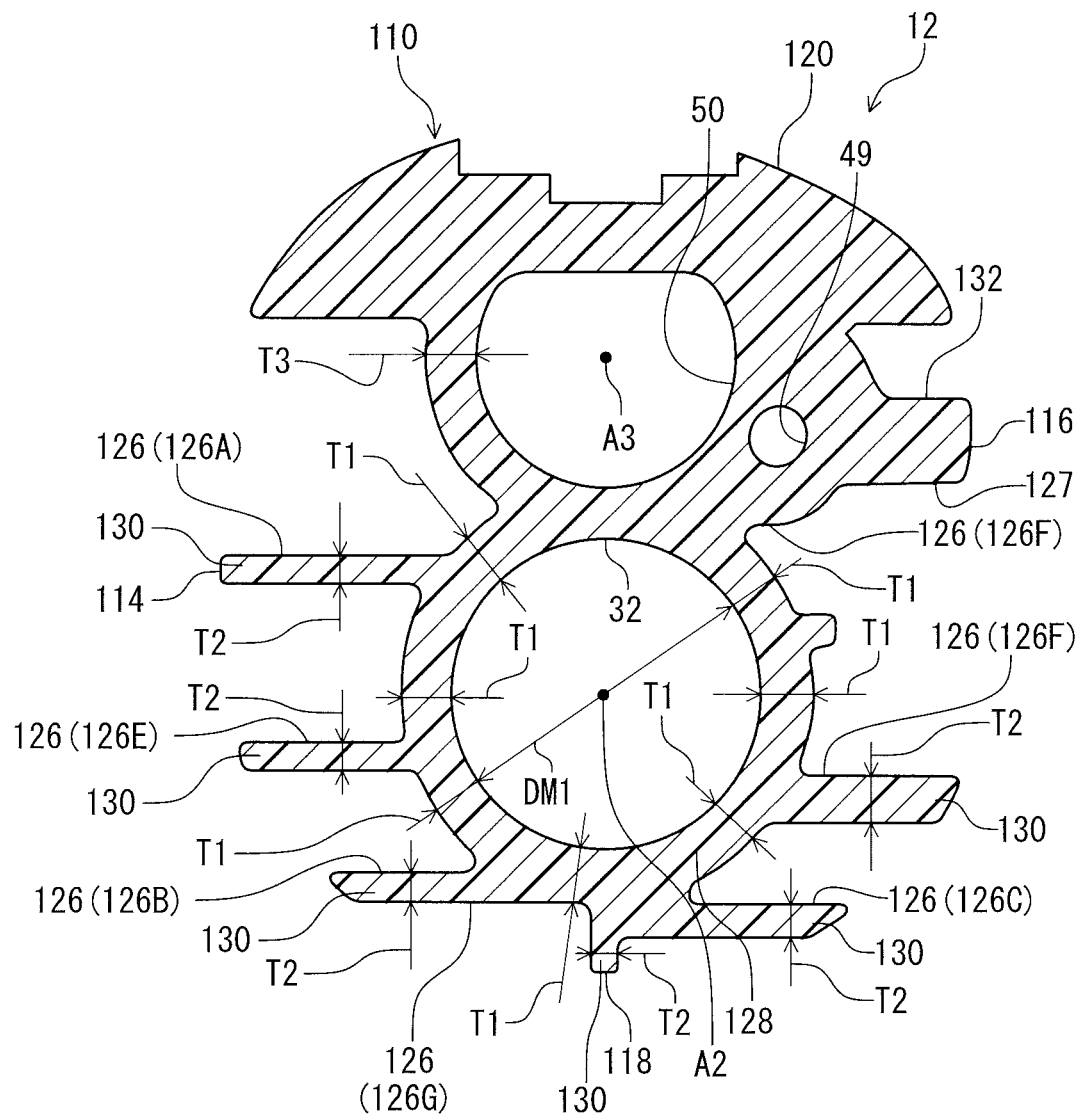
FIG. 23 is a cross-sectional view of the base member taken along line XXIII-XXIII of FIG. 18.
Figure 24:
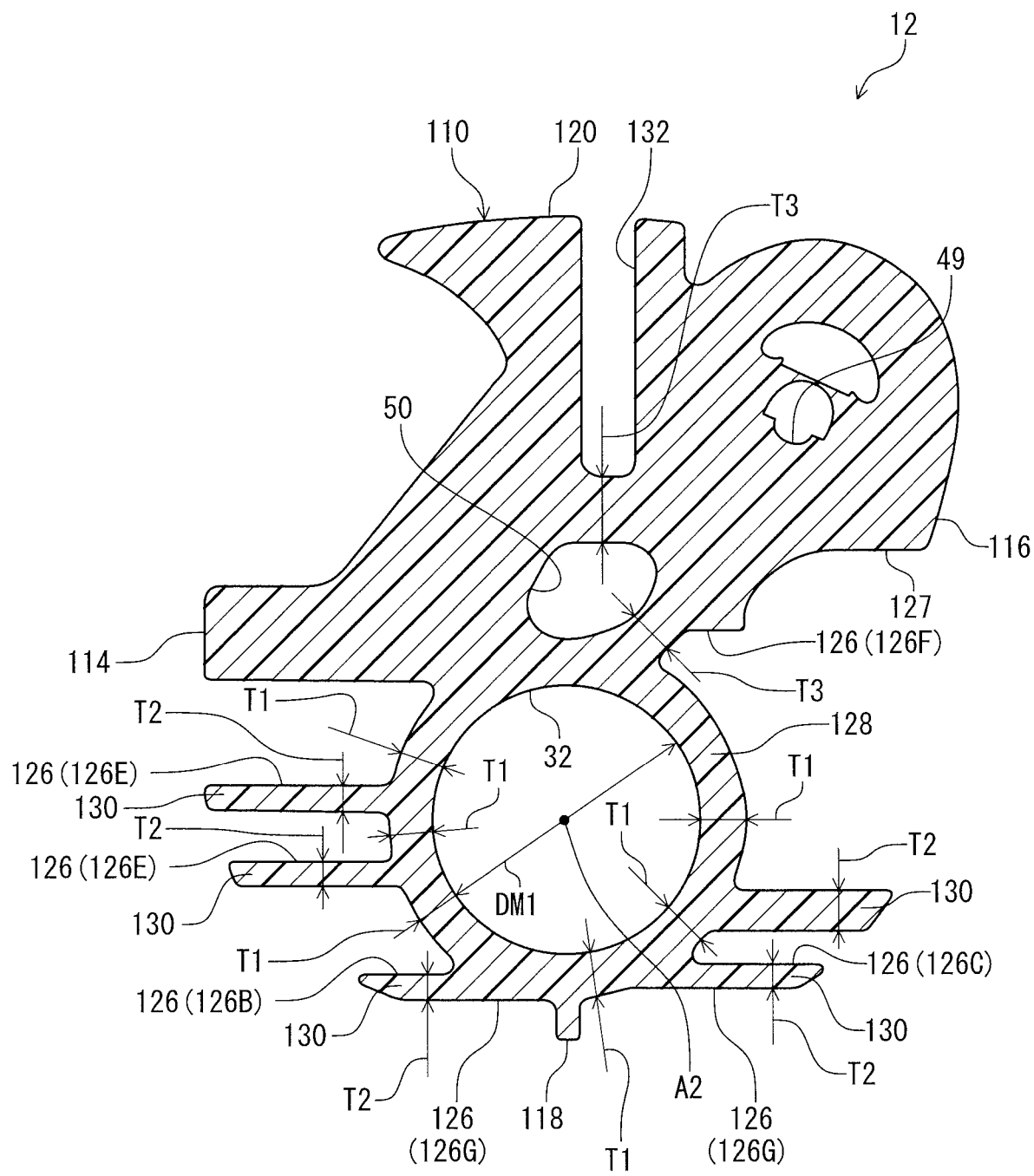
FIG. 24 is a cross-sectional view of the base member taken along line XXIV-XXIV of FIG. 18.
Figure 25:
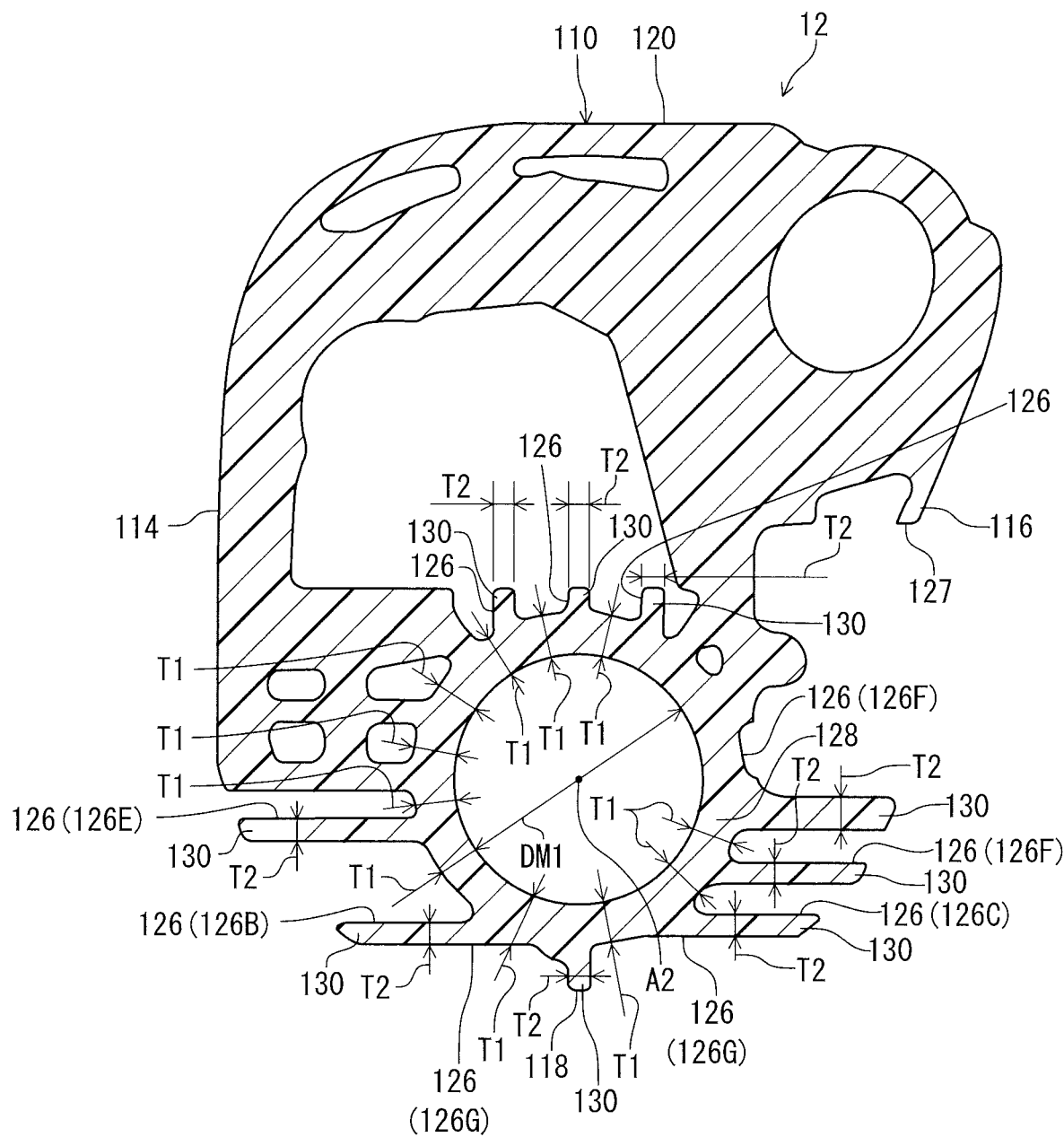
FIG. 25 is a cross-sectional view of the base member taken along line XXV-XXV of FIG. 18.

As seen in FIGS. 21 to 23, the reservoir-wall thickness T3 is defined between the reservoir bore 50 and the recess 126. In this embodiment, the reservoir-wall thickness T3 is defined between the reservoir bore 50 and the continuous recess 126A. The base member 12 includes a rib 138 provided between the recess 126 (the continuous recess 126A) and the additional recess 132. The rib 138 has a thickness T5 equal to or larger than 0.2 mm and equal to or smaller than 3 mm. The thickness T5 of the rib 138 is preferably equal to or larger than 0.4 mm and equal to or smaller than 2 mm. In this embodiment, the thickness T5 of the rib 138 is equal to 1 mm. In another embodiment, for example, the thickness T5 of the rib 138 can be equal to 0.45 mm. Furthermore, the thickness T5 of the rib 138 is equal to or smaller than the reservoir-wall thickness T3. However, the thickness T5 of the rib 138 is not limited to this embodiment.

The base member 12 has a maximum thickness T6 (FIG. 19) defined between the cylinder bore 32 and the outer surface 110. In this embodiment, the maximum thickness T6 is defined between the cylinder bore 32 and the first surface 114 on the fifth surface 122 as viewed along the cylinder center axis A2 of the cylinder bore 32. The maximum thickness T6 is equal to or larger than 5 mm. However, the maximum thickness T6 is not limited to this embodiment.

As seen in FIG. 22, the at least one recess 126 has a maximum depth DP1 defined from the outer surface 110 to the cylinder wall 128. The cylinder-wall thickness T1 is smaller than the maximum depth DP1 of the at least one recess 126. However, dimensional relationship between the cylinder-wall thickness T1 and the maximum depth DP1 is not limited to this embodiment.

In this embodiment, the base member 12 includes the recesses 126 and the additional recesses 132. However, the recesses 126 can be omitted from the base member 12, and the additional recesses 132 can be omitted from the base member 12. Namely, the base member 12 can include only the recesses 126 provided about the cylinder bore 32 without the additional recesses 132. The base member 12 can include only the additional recesses 132 provided about the reservoir bore 50 without the recesses 126.

With the bicycle operating device 10, the at least one recess 126 reduces deformation of an inner peripheral surface of the cylinder bore 32 during manufacturing process of the base member 12 made of the resin material.

Figure 28:
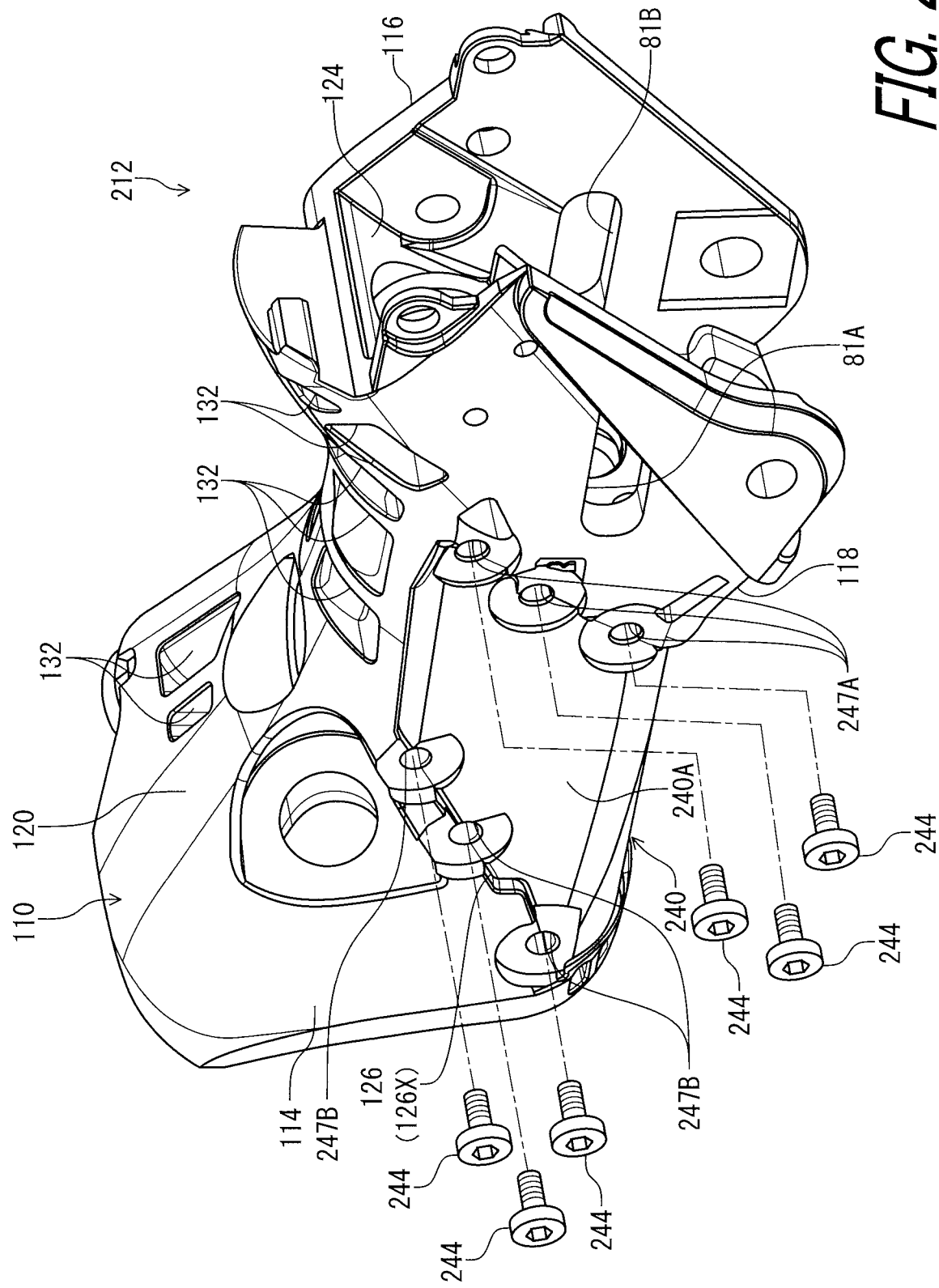
FIG. 28 is a perspective view of a base member, a first separate member, and a second separate member of a bicycle operating device in accordance with a modification.
Figure 29:
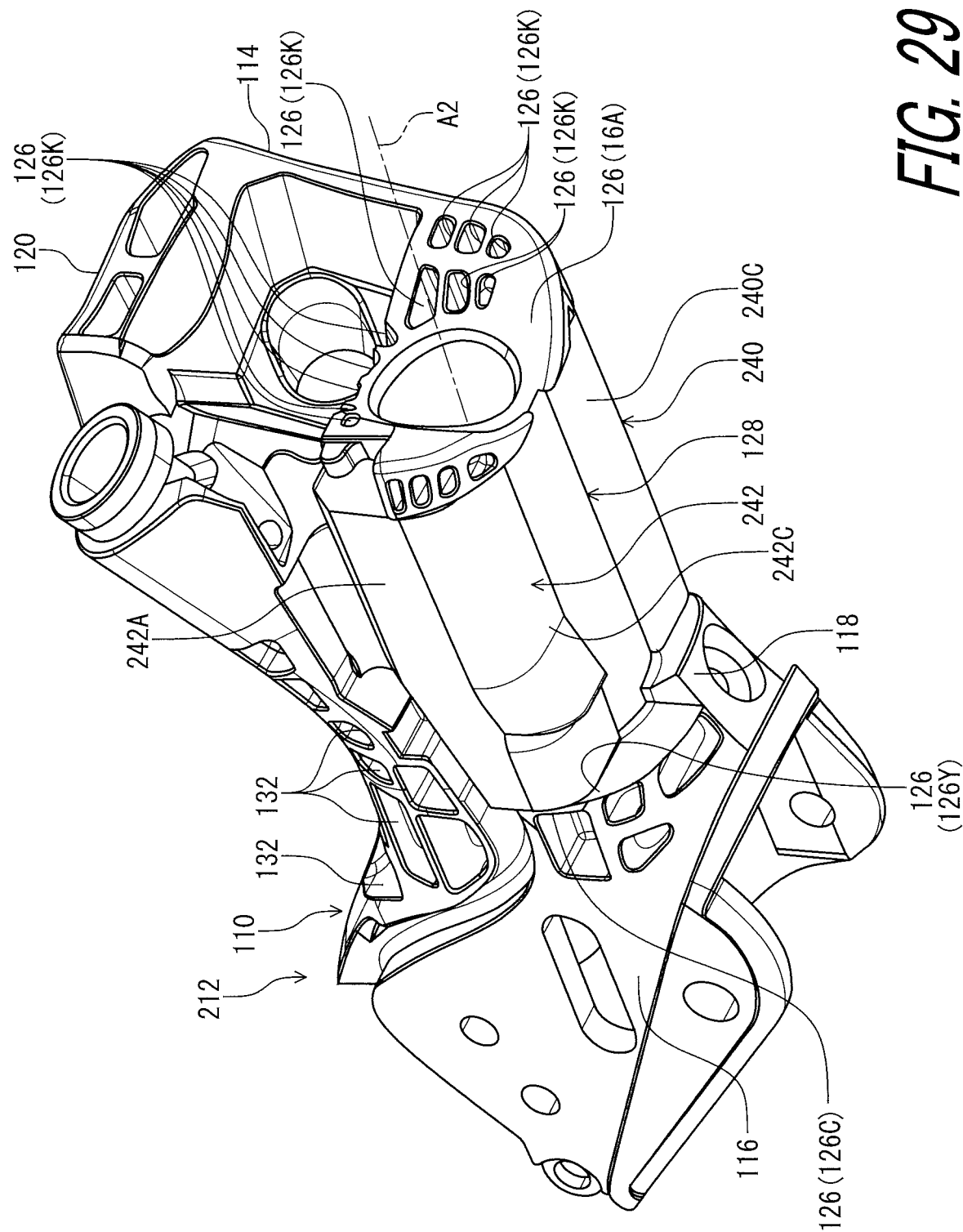
FIG. 29 is another perspective view of the base member, the first separate member, and the second separate member illustrated in FIG. 28.

As seen in FIGS. 28 and 29, the bicycle operating device 10 of the above embodiment can comprise a base member 212 in accordance with a modification. The base member 212 has substantially the same structure as that of the base member 12. The base member 212 includes the at least one recess 126. In this modification, the bicycle operating device 10 further comprises a first separate member 240 and a second separate member 242.

Figure 30:
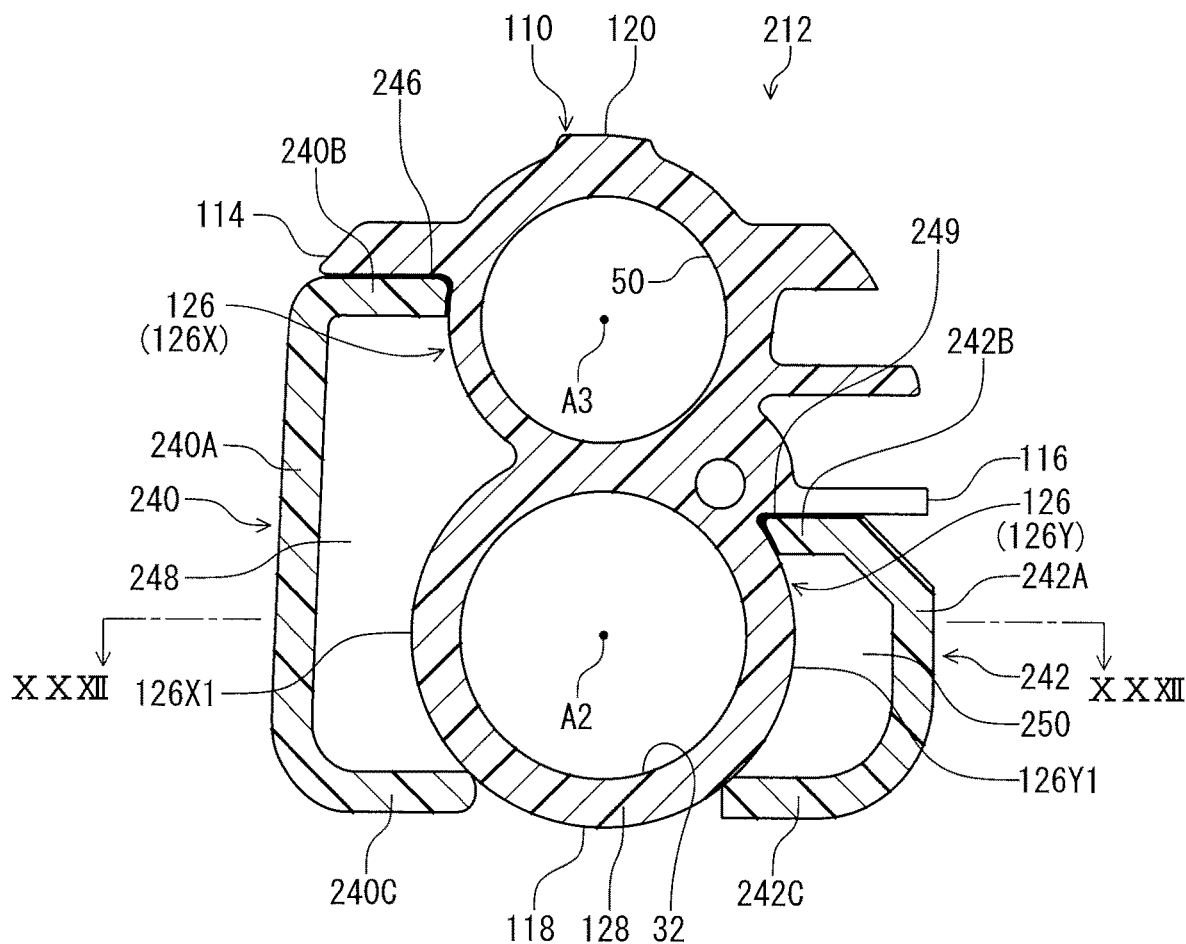
FIG. 30 is a cross-sectional view of the base member, the first separate member, and the second separate member taken along line XXX-XXX of FIG. 32.

As seen in FIG. 30, the at least one recess 126 includes a first side recess 126X provided on the outer surface 110 to define the cylinder wall 128 between the cylinder bore 32 and the first side recess 126X. The first side recess 126X is provided on the first surface 114 of the outer surface 110. The at least one recess 126 includes a second side recess 126Y provided on the outer surface 110 to define the cylinder wall 128 between the cylinder bore 32 and the second side recess 126Y. The second side recess 126Y is provided on the second surface 116 of the outer surface 110. The first separate member 240 is provided on an opposite side of the second separate member 242 relative to the cylinder bore 32.

Figure 31:
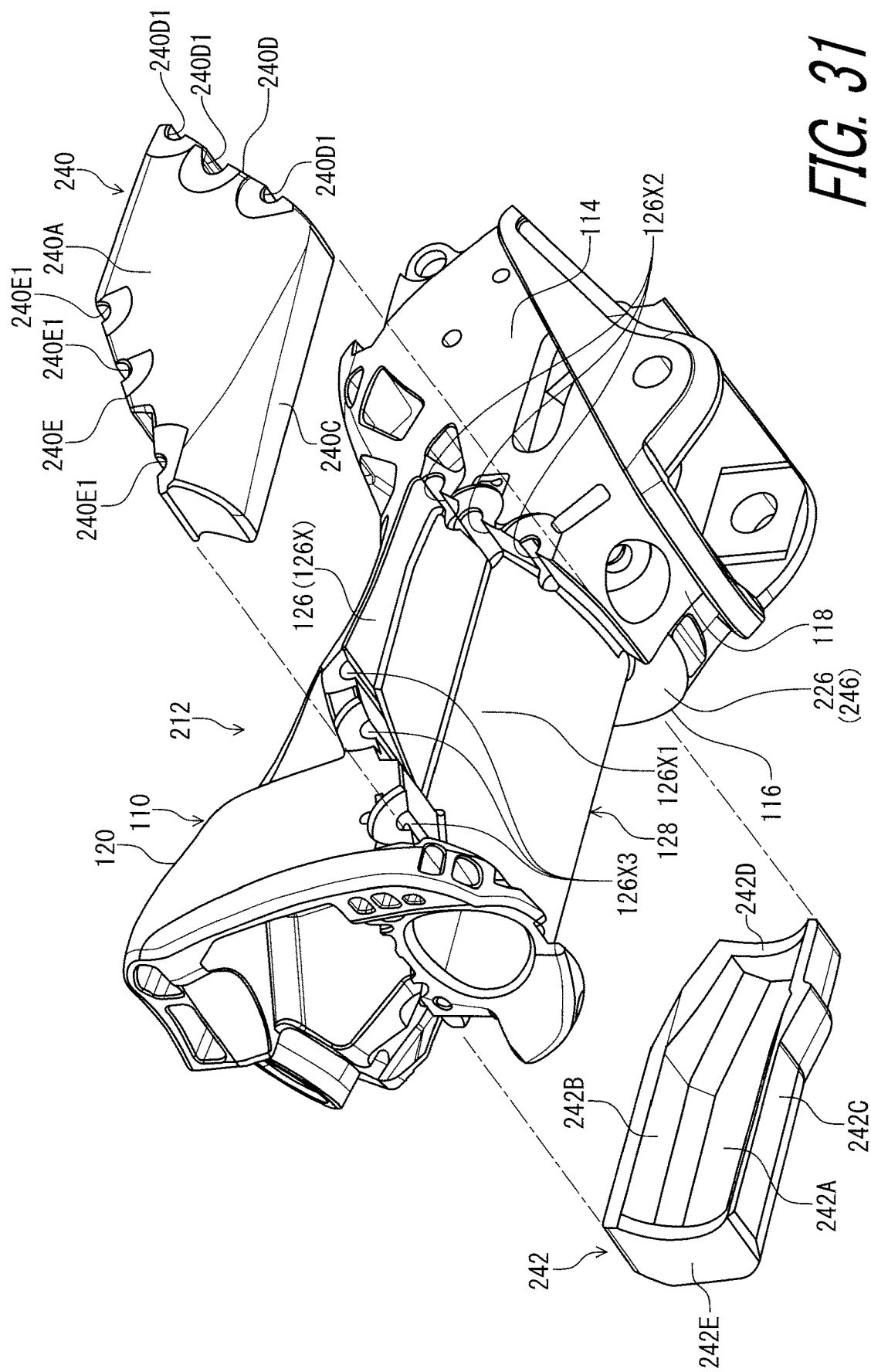
FIG. 31 is an exploded perspective view of the base member, the first separate member, and the second separate member illustrated in FIG. 28.

As seen in FIGS. 30 and 31, the first separate member 240 is a separate member from the base member 212 and is provided in the first side recess 126X. The first separate member 240 is made of a first non-metallic material. The first non-metallic material includes at least one of a resin material and an elastic material. The first separate member 240 is attached to the base member 212 with at least one of a fastener and an adhesive agent.

Figure 32:
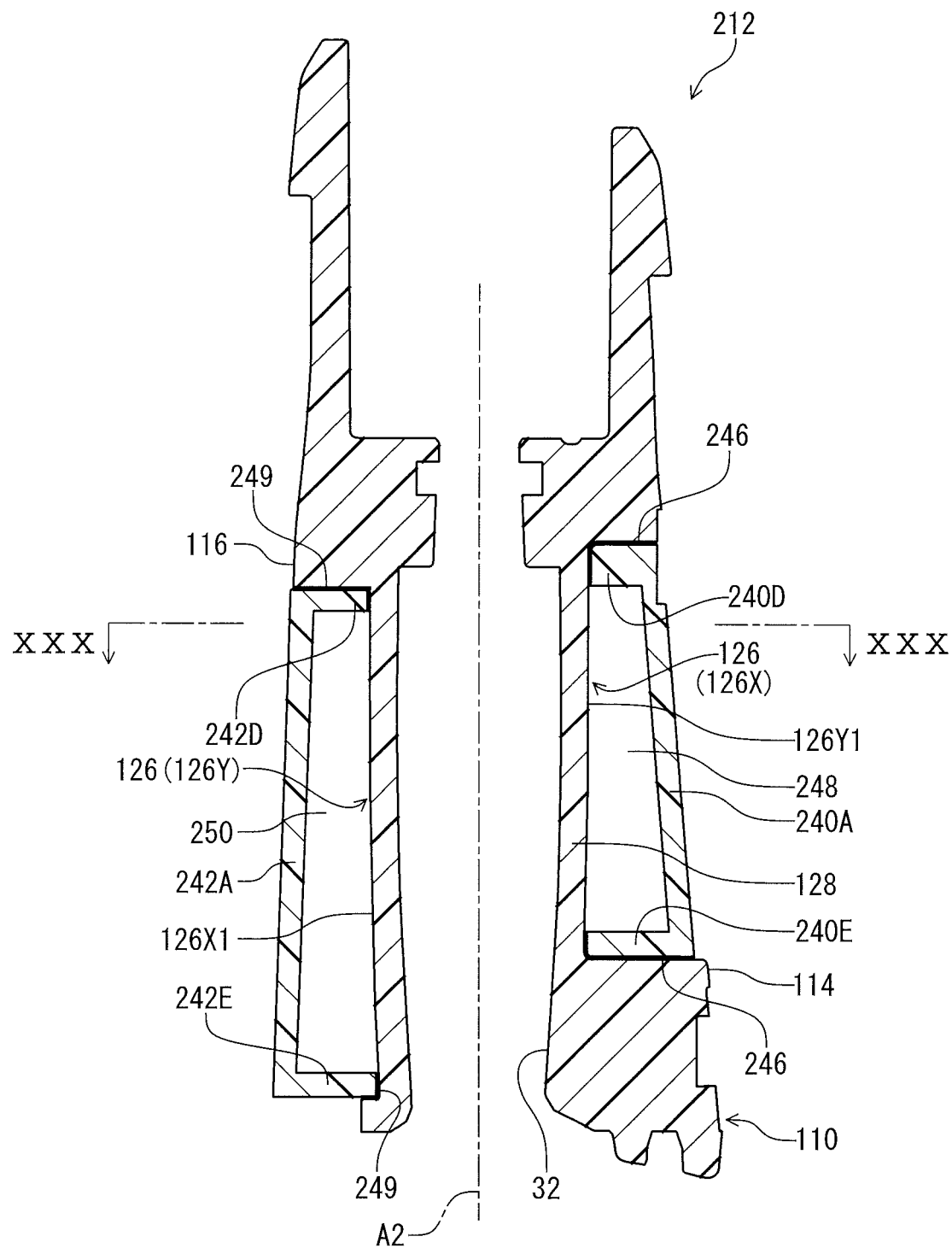
FIG. 32 is a cross-sectional view of the base member, the first separate member, and the second separate member taken along line XXXII-XXXII of FIG. 30.

In this embodiment, as seen in FIG. 28, the first separate member 240 is attached to the base member 212 with fasteners 244. As seen in FIGS. 30 and 32, the first separate member 240 is attached to the base member 212 with an adhesive agent 246. However, at least one of the fastener 244 and the adhesive agent 246 can be omitted from the base member 212. The first separate member 240 can be attached to the base member 212 with another securing structure such as press fitting instead of or in addition to at least one of the fastener 244 and the adhesive agent 246.

As seen in FIG. 30, the first separate member 240 includes a first separate wall 240A spaced apart from a first bottom surface 126X1 of the first side recess 126X to define a first internal space 248 between the first separate wall 240A and the first bottom surface 126X1. The first separate member 240 includes first contact walls 240B and 240C. The first contact wall 240B extends from the first separate wall 240A so as to be in contact with the base member 212. The first contact wall 240C extends from the first separate wall 240A so as to be in contact with the base member 212. The first contact wall 240C is spaced apart from the first contact wall 240B. The first internal space 248 is provided between the first contact walls 240B and 240C.

Figure 33:
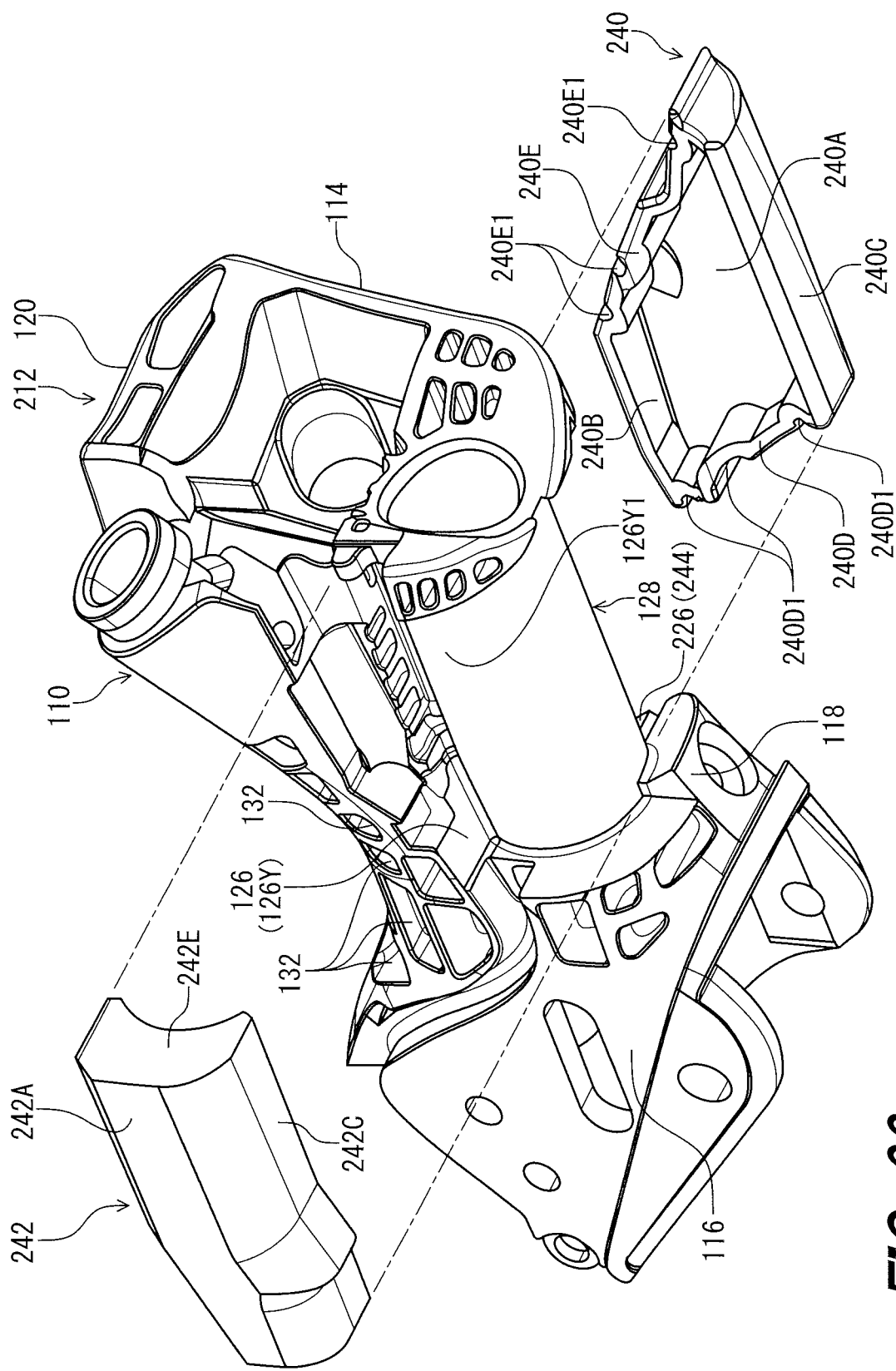
FIG. 33 is another exploded perspective view of the base member, the first separate member, and the second separate member illustrated in FIG. 28.

As seen in FIGS. 32 and 33, the first separate member 240 includes first contact walls 240D and 240E. The first contact wall 240D extends from the first separate wall 240A so as to be in contact with the base member 212. The first contact wall 240E extends from the first separate wall 240A so as to be in contact with the base member 212. The first contact wall 240E is spaced apart from the first contact wall 240D. The first internal space 248 is provided between the first contact walls 240D and 240E.

As seen in FIG. 31, the first contact wall 240D includes first grooves 240D1. The first contact wall 240E includes first grooves 240E1. The first side recess 126X includes second grooves 126X2 and second grooves 126X3. The first groove 240D1 and the second groove 126X2 provides a hole 247A (FIG. 28). The first groove 240E1 and the second groove 126X3 provides a hole 247B (FIG. 28). As seen in FIG. 28, the fastener 244 is threadedly engaged in the hole 247A or 247B.

As seen in FIGS. 30 and 33, the second separate member 242 is a separate member from the base member 212 and is provided in the second side recess 126Y. The second separate member 242 is made of a second non-metallic material. The second non-metallic material includes at least one of a resin material and an elastic material. The second separate member 242 is attached to the base member 212 with at least one of a fastener and an adhesive agent.

In this embodiment, as seen in FIGS. 30 and 32, the second separate member 242 is attached to the base member 212 with an adhesive agent 249. However, the adhesive agent 249 can be omitted from the base member 212. The second separate member 242 can be attached to the base member 212 with another securing structure such as the fastener or press fitting instead of or in addition to the adhesive agent 249.

As seen in FIG. 30, the second separate member 242 includes a second separate wall 242A spaced apart from a second bottom surface 126Y1 of the second side recess 126Y to define a second internal space 250 between the second separate wall 242A and the second bottom surface 126Y1. The second separate member 242 includes second contact walls 242B and 242C. The second contact wall 242B extends from the second separate wall 242A so as to be in contact with the base member 212. The second contact wall 242C extends from the second separate wall 242A so as to be in contact with the base member 212. The second contact wall 242C is spaced apart from the second contact wall 242B. The second internal space 250 is provided between the second contact walls 242B and 242C.

As seen in FIGS. 31 and 32, the second separate member 242 includes second contact walls 242D and 242E. The second contact wall 242D extends from the second separate wall 242A so as to be in contact with the base member 212. The second contact wall 242E extends from the second separate wall 242A so as to be in contact with the base member 212. The second contact wall 242E is spaced apart from the second contact wall 242D. The second internal space 250 is provided between the second contact walls 242D and 242E.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
a base member made of a resin material, the base member including
an outer surface,
a cylinder bore, and
at least one recess provided on the outer surface to define a cylinder wall between the cylinder bore and the at least one recess, the cylinder wall having a cylinder-wall thickness defined between the cylinder bore and the at least one recess, the cylinder-wall thickness being equal to or larger than 1 mm and equal to or smaller than 3.5 mm.

2. The bicycle operating device according to claim 1, wherein
the at least one recess includes recesses each provided on the outer surface to define the cylinder wall between the cylinder bore and the recesses.

3. The bicycle operating device according to claim 2, wherein
the base member includes at least one rib provided between adjacent two of the recesses, and
the at least one rib has a thickness equal to or larger than 0.2 mm and equal to or smaller than 3 mm.

4. The bicycle operating device according to claim 2, wherein
the base member includes at least one rib provided between adjacent two of the recesses, and
the at least one rib has a thickness equal to or smaller than the cylinder-wall thickness.

5. The bicycle operating device according to claim 1, wherein
at least one of the at least one recess extends from the outer surface toward the cylinder bore.

6. The bicycle operating device according to claim 1, wherein
at least one of the at least one recess extends along a cylinder center axis of the cylinder bore.

7. The bicycle operating device according to claim 1, further comprising an operating member pivotally coupled to the base member about a pivot axis, wherein
the base member includes
a first end portion to be mounted to a bicycle handlebar, and
a second end portion opposite to the first end portion, and
the cylinder bore is closer to the first end portion than the pivot axis.

8. The bicycle operating device according to claim 1, wherein
the base member includes
a first end portion to be mounted to a bicycle handlebar,
a second end portion opposite to the first end portion, and
a grip portion provided between the first end portion and the second end portion.

9. The bicycle operating device according to claim 8, wherein
the cylinder bore is provided in the grip portion.

10. The bicycle operating device according to claim 1, wherein
the base member includes
a reservoir bore connected to the cylinder bore, and
at least one additional recess provided on the outer surface to define a reservoir wall between the reservoir bore and the at least one additional recess.

11. The bicycle operating device according to claim 10, wherein
the reservoir wall has a reservoir-wall thickness defined between the reservoir bore and the at least one additional recess, and
the reservoir-wall thickness is equal to or larger than 0.5 mm and equal to or smaller than 6 mm.

12. The bicycle operating device according to claim 10, wherein the reservoir wall has a reservoir-wall thickness defined between the reservoir bore and the at least one additional recess, and the cylinder-wall thickness is equal to or smaller than the reservoir-wall thickness.

13. The bicycle operating device according to claim 1, wherein the base member has a maximum thickness defined between the cylinder bore and the outer surface, and the maximum thickness is equal to or larger than 5 mm.

14. The bicycle operating device according to claim 1, wherein the at least one recess has a maximum depth defined from the outer surface to the cylinder wall, and the cylinder-wall thickness is smaller than the maximum depth of the at least one recess.

15. The bicycle operating device according to claim 1, further comprising a first separate member, wherein the at least one recess includes a first side recess provided on the outer surface to define the cylinder wall between the cylinder bore and the first side recess, and the first separate member is a separate member from the base member and is provided in the first side recess.

16. The bicycle operating device according to claim 15, wherein the first separate member is made of a first non-metallic material.

17. The bicycle operating device according to claim 16, wherein the first non-metallic material includes at least one of a resin material and an elastic material.

18. The bicycle operating device according to claim 15, wherein the first separate member is attached to the base member with at least one of a fastener and an adhesive agent.

19. The bicycle operating device according to claim 15, wherein the first separate member includes a first separate wall spaced apart from a first bottom surface of the first side recess to define a first internal space between the first separate wall and the first bottom surface.

20. The bicycle operating device according to claim 15, further comprising a second separate member, wherein the at least one recess includes a second side recess provided on the outer surface to define the cylinder wall between the cylinder bore and the second side recess, and the second separate member is a separate member from the base member and is provided in the second side recess.

21. The bicycle operating device according to claim 20, wherein the first separate member is provided on an opposite side of the second separate member relative to the cylinder bore.

22. The bicycle operating device according to claim 20, wherein the second separate member is made of a second non-metallic material.

23. The bicycle operating device according to claim 22, wherein the second non-metallic material includes at least one of a resin material and an elastic material.

24. The bicycle operating device according to claim 20, wherein the second separate member is attached to the base member with at least one of a fastener and an adhesive agent.

25. The bicycle operating device according to claim 20, wherein the second separate member includes a second separate wall spaced apart from a second bottom surface of the second side recess to define a second internal space between the second separate wall and the second bottom surface.

26. A bicycle operating device comprising:

a base member made of a resin material, the base member including an outer surface, a cylinder bore having an inner diameter, and recesses each provided on the outer surface to define a cylinder wall between the cylinder bore and the recesses, wherein the cylinder wall has a cylinder-wall thickness defined between the cylinder bore and the recesses, a ratio of the cylinder-wall thickness to the inner diameter is equal to or larger than 5% and equal to or smaller than 40%.

* * * * *